(12) United States Patent
Zorea et al.

(10) Patent No.: US 10,571,561 B2
(45) Date of Patent: Feb. 25, 2020

(54) AERIAL TRAFFIC MONITORING RADAR

(71) Applicant: ARTSYS360 LTD., Holon (IL)

(72) Inventors: Meir Zorea, Rehovot (IL); Erez Ben-Ari, Rishon le Zion (IL)

(73) Assignee: ARTSYS360 LTD., Holon (IL)

( * ) Notice: Subject to any disclaimer, the term of this patent is extended or adjusted under 35 U.S.C. 154(b) by 0 days.

(21) Appl. No.: 15/548,910

(22) PCT Filed: Feb. 9, 2016

(86) PCT No.: PCT/US2016/017060
§ 371 (c)(1),
(2) Date: Aug. 4, 2017

(87) PCT Pub. No.: WO2016/130495
PCT Pub. Date: Aug. 18, 2016

(65) Prior Publication Data
US 2018/0024236 A1    Jan. 25, 2018

Related U.S. Application Data

(60) Provisional application No. 62/113,644, filed on Feb. 9, 2015.

(51) Int. Cl.
*G01S 13/91*        (2006.01)
*G01S 13/86*        (2006.01)
(Continued)

(52) U.S. Cl.
CPC ............... *G01S 13/91* (2013.01); *G01S 3/46* (2013.01); *G01S 5/0027* (2013.01); *G01S 7/003* (2013.01);
(Continued)

(58) Field of Classification Search
CPC .................................. G01S 13/91; G01S 3/46
(Continued)

(56) References Cited

U.S. PATENT DOCUMENTS 2,954,558 A   9/1960   Honey et al.
3,568,203 A   3/1971   Venters et al.
(Continued)

FOREIGN PATENT DOCUMENTS

CN    102122173 B    3/2012
CN    104122527 A    10/2014

OTHER PUBLICATIONS

Butler, et al., Beam-Forming Matrix Simplifies Design of Electronically Scanned Antennas, Electronic Design, Apr. 1961, pp. 170-173, vol. 9.
(Continued)

*Primary Examiner* — Peter M Bythrow
*Assistant Examiner* — Helena H Seraydaryan
(74) *Attorney, Agent, or Firm* — Browdy and Neimark, P.L.L.C.

(57) ABSTRACT

An unmanned aerial vehicles (UAVs) aerial traffic monitoring system is provided and includes one or more UAVs comprising a transponder and at least one of a transmitter, a localization module and/or a communication module, radar systems covering and locating objects from 0° to 360° in azimuth and within a range of from −45° to 45° in elevations below and above the horizon, a cloud software stored in a non-transitory memory and configured to be executed by a processor, that stores records of operating UAVs so as to allow online and real time situational awareness of UAV aerial traffic, aerial traffic load, and aerial collision predictions.

41 Claims, 16 Drawing Sheets

(51) Int. Cl.
    *G01S 13/87*     (2006.01)
    *G01S 7/00*     (2006.01)
    *G01S 19/49*     (2010.01)
    *G01S 3/46*     (2006.01)
    *G01S 5/00*     (2006.01)
    *G08G 5/00*     (2006.01)
    *G01S 13/93*     (2020.01)
    *G08G 5/04*     (2006.01)

(52) U.S. Cl.
    CPC .............. *G01S 13/86* (2013.01); *G01S 13/87* (2013.01); *G01S 13/9303* (2013.01); *G01S 19/49* (2013.01); *G08G 5/0069* (2013.01); *G08G 5/0078* (2013.01); *G08G 5/045* (2013.01)

(58) Field of Classification Search
    USPC .......................................................... 342/30
    See application file for complete search history.

(56) References Cited

U.S. PATENT DOCUMENTS

| | | | |
|---|---|---|---|
| 4,203,114 A | | 5/1980 | Gerst et al. |
| 4,297,704 A | * | 10/1981 | Marom ..................... G01S 3/14 |
| | | | 324/76.36 |
| 5,128,682 A | | 7/1992 | Kruger |
| 5,379,224 A | | 1/1995 | Brown et al. |
| 6,420,993 B1 | * | 7/2002 | Varon ................... G08G 5/0078 |
| | | | 342/29 |
| 6,697,017 B1 | | 2/2004 | Shmuel |
| 7,427,953 B2 | | 9/2008 | Chiang et al. |
| 7,868,817 B2 | * | 1/2011 | Meyers ................ G01S 13/4454 |
| | | | 342/118 |
| 7,982,664 B1 | | 7/2011 | Uscinowicz |
| 8,334,808 B2 | | 12/2012 | Remez et al. |
| 8,335,808 B2 | | 12/2012 | Shieh |
| 8,380,425 B2 | | 2/2013 | Duggan et al. |
| 8,886,459 B2 | * | 11/2014 | Stefani ................... G01C 21/00 |
| | | | 701/120 |
| 9,739,870 B1 | * | 8/2017 | Beckman .............. B64C 39/024 |
| 2002/0175859 A1 | | 11/2002 | Newberg et al. |
| 2006/0114158 A1 | | 6/2006 | Chang et al. |
| 2010/0085235 A1 | | 4/2010 | Meyers et al. |
| 2010/0121575 A1 | | 5/2010 | Aldridge et al. |
| 2011/0130636 A1 | | 6/2011 | Daniel et al. |
| 2011/0304508 A1 | | 12/2011 | Remez et al. |
| 2013/0027240 A1 | | 1/2013 | Chowdhury |
| 2014/0032034 A1 | * | 1/2014 | Raptopoulos ........ G08G 5/0069 |
| | | | 701/25 |
| 2014/0070979 A1 | | 3/2014 | Andersson et al. |
| 2017/0045613 A1 | * | 2/2017 | Wang .................. G01S 13/9303 |

OTHER PUBLICATIONS

Gallager, et al., A Distributed Algorithm for Minimum-Weight Spanning Trees, ACM Transactions on Programming Languages and Systems (TOPLAS), Jan. 1983, pp. 66-77, vol. 5, issue 1.

* cited by examiner

AERIAL TRAFFIC MONITORING RADAR

RELATED APPLICATIONS

The present application is related to U.S. Application No. PCT/US16/16507, filed on Feb. 4, 2016, the entirety of which is incorporated by reference herein.

FIELD AND BACKGROUND OF THE INVENTION

The present invention, in some embodiments thereof, relates to radar systems and more particularly to systems and methods for detecting, tracking and monitoring the spatial location of unmanned aerial vehicles (UAVs).

An unmanned aerial vehicle or unmanned aircraft vehicle (UAV), sometimes also referred to as an unpiloted air system (UAS), an unpiloted aerial vehicle (UAV) or a remotely piloted aircraft (RPA), is an aircraft without a human pilot aboard. According to U.S. International Civil Aviation Organization (ICAO), UAVs are classified into two types: (i) autonomous aircraft; and (ii) remotely piloted aircraft system (PRAS), which is subject to civil regulation under ICAO and under the relevant national aviation authority. The typical launch and recovery method of an unmanned aircraft is by the function of an automatic system or an external operator on the ground. Drones are one example of UAVs. UAVs are usually deployed for military and special operation applications, but also used in a small but growing number of civil applications such as policing and firefighting and other nonmilitary security work such as inspection of power stations or pipelines. UAVs are often preferred for missions that are too "dull, dirty or dangerous" for manned aircraft.

In high-density urban environments, as well as in smaller cities and rural areas, demand on ground transportation infrastructure has increased and continues to increase to the point that many metropolitan areas are heavily congested and road transportation networks are inefficient. The inefficiencies are also dramatic in cities in many emerging countries or other locations where ground infrastructure has not scaled quickly enough to follow the population increase or the growth in the economy. Hence, often enough, access to physical goods is hindered by the inflexible, inefficient (in energy, time and cost) transportation solutions of the present day.

U.S. Patent Application Publication No. 2014/0032034, which is incorporated herein by reference in its entirety as if fully disclosed herein, discloses systems for air transportation of goods and/or people using autonomous and/or remotely piloted UAVs. The systems containing a plurality of autonomous electric flying vehicles comprising a plurality of automated ground stations configured to communicate with the UAVs, and logistics software that operates the system. The aerial vehicles comprise a fixed wing and one or more rotors, and a package interface capable of accepting a package for transport. A new, scalable method of transportation that would reduce the demand on road infrastructure is desirable. Modern digital connectedness increases the need for disruption of the current way goods and people are transported. As modern transportation solutions have significantly lagged behind the digital revolution, UAVs emerge as a promising means for aerial delivery of goods.

Inexpensive, computerized flight controllers have made it comparatively easy to fly multi-rotor systems. Because they are capable of vertical-take-off-and-landing (VTOL), and relatively compact, UAVs can be deployed essentially anywhere, and in the hands of a skilled pilot, they can be maneuvered nearly anywhere.

UAVs be of a fixed wing, hybrid vehicle, or rotorcraft where rotorcraft may be of a single-rotor, dual rotor, trirotor, quadrorotor (quadcopter), hexarotor, or octorotor design.

Some known, commercially available UAVs are Phantom 3 by DJI, Q500 4K by Yuneec and Solo by 3DR.

To meet the growing need and the growing demand to use UAVs, national authorities such as the U.S. federal aviation administration (FAA) are advancing legislation that will make use of UAVs manageable. It is expected that some of the restrictions that will be imposed by the FAA is the requirement that UAVs be equipped with at least two of: a transponder, a localization module such as global positioning system (GPS), inertial navigation system (INS) and the like, satellite communication module, and/or cellular communication module, so as to enable direct identification and spatial location of UAVs as well as communicating with UAVs. To name a few, an example for commercially available transponders may be the GTX330, GTX333 and GTX323 by Garmin; some known, commercially available GPS modules are NEO-M8M by Ublox and Jupiter SE868-AS by Telit; some known, commercially available INS modules are BD935-INS by Trimble and BNO055 by Bosch; some known, commercially available satellite communication modules are RockBLOCK Mkt by Sparkfun and GSP-1720 by Globalstar; and some known, commercially available cellular communication modules are Sara-G3 by Ublox and LE910 series by Telit.

One of the major technical problems that may, at least partially, hinder advancing the legal operation of UAVs is the current lack of an efficient way to monitor their aerial traffic, namely, the ability to detect, track, and spatially locate one or more flying UAVs, at real time.

A further technical problem concerning the operation of UAVs is controlling the flying routes of UAVs, while taking into consideration, at every given moment, the spatial location of other objects flying in the UAV's immediate vicinity or objects projecting from the ground so as in times of emergency, immediate notification and instructions may be provided to one or several UAVs simultaneously in order to control UAV traffic to avoid these obstacles.

All of the above mentioned technical problems suggest a widely recognized need for, and it would be highly advantageous to have a radar system of a small form factor compared to known dimensions of common radar systems and a method for broadband reception and bearing measurement of UAVs both in azimuth and elevation performed in the digital domain rather than in the analog domain so as to avoid highly complex, expensive analog methods and means. Such a system with affordable costs and low radiated power, so as to comply with urban safety regulations, along with the ability of grid operation, would address the technical problems stated above.

SUMMARY OF INVENTION

The use of unmanned aerial vehicles (UAVs) to transport goods in high-density urban environments and/or in places where ground infrastructure and road transportation networks are inefficient or inoperable, as well as in remote and/or inaccessible areas, is increasing. UAVs are also being increasingly utilized for other civilian and military application such as surveillance. The booming popularity of UAVs is due, at least partially, to inexpensive flight control systems that make UAVs accessible and affordable. Some known, commercially available UAVs are Phantom 3 by DJI, Q500 4K by Yuneec and Solo by 3DR.

Today's UAVs can be flown with varying degrees of autopilot assistance, from nearly full autopilot to full "agility" modes that disable virtually all safeties. Greater maneuverability would result with growing number of small UAVs in the air. Because of this explosion, some governments have recognized that this technology needs to be formally addressed, not to mention the growing desire on the part of businesses to put UAVs to commercial use without going through the current monolithic aviation administration approval procedures.

The present inventors have envisioned, and successfully obtained, a novel 3D radar system for UAV aerial traffic monitoring, that addresses the technical problems stated above.

The radar system described herein is of a small form factor compared to known dimensions of common radar systems and is characterized by low radiated power so as to comply with urban safety regulations. Furthermore, the radar system is designed to allow rapid deployment and easy installation. The radar system described herein affords:
 1. monitoring the aerial environment for detection and tracking of UAVs; and
 2. communicating, querying and interrogating onboard transponders in order to identify a UAV.

According to some embodiments of the invention, the radar is designed to operate in the unlicensed industrial, scientific and medical (ISM) frequency radio bands as defined by the Constitution and Convention of the International Telecommunication Union (ITU Constitution and Convention). For example, In the United States, uses of the ISM bands are governed by Part 18 of the Federal Communications Commission (FCC) rules, while Part 15 contains the rules for unlicensed communication devices, even those that share ISM frequencies. In Europe, the ETSI is responsible for governing ISM bands.

According to some embodiments of the invention, the radar system described herein is operable in a grid. The grid affords the following properties:
 1. coverage of each UAV by several radars to thereby enhance performance by smooth handover and continuous tracking;
 2. decrease false alarm incidences; and
 3. help avoiding over-interrogation of the transponder located on the UAVs.

According to some embodiments of the invention, the grid is connected to a data cloud software that keep track of UAVs so as to allow online and real time situational awareness of aerial traffic, aerial traffic load, aerial collision predictions, et cetera.

According to some embodiments of the invention, each one of the radar systems in the grid may access the data cloud where according to some other embodiments, only one or more than one of the radar systems may access the data cloud. In the latter case, the radar systems allowed to access the data cloud may be referred to as "master systems". The master systems collect and receive data from the grid members. The master systems may perform some processing of the data and upload it to the data cloud.

According to some embodiments of the invention, the data cloud may be accessed directly by state authorities such as FAA in the U.S. and other law-enforcement authorities and therefore be able to communicate, identify and in times of emergency, provide immediate notification and instructions to one or several UAVs simultaneously in order to deviate UAV traffic and even jam UAVs.

According to some embodiments of the invention, while a primary radar works best with large all-metal aircraft, but not so well on small, composite aircraft, let alone UAVs, the operable range of the radar system may decrease. Additionally, the radar's operative range may also be affected due to transmission power limitations that might be imposed in order to comply with urban safety regulations. Hence, the radar described herein may serve as a secondary radar that when combined with a transponder, overcome these limitations. The radar system includes at least one receive and/or transmit (Rx/Tx) module. Hence, the radar system may be used so as to excite the transponder. The replied signal once received by the radar system may be processed to infer the bearing and spatial location of the transponder over 0° to 360° in azimuth within a predefined range of elevations below and above the horizon.

The radar system comprises an antenna system for estimating the direction-of-arrival (DOA), such as but not limited to, the antenna system described in U.S. Pat. No. 8,334,808, which is incorporated herein by reference as if fully disclosed herein. However, in contrast to the system taught in U.S. Pat. No. 8,335,808, the present invention relates to a radar system and method for inferring the direction-of-arrival (DOA) of reflected signals covering 0° to 360° in azimuth within a predefined range of elevations below and above the horizon by incorporating the multimodal and interferometer direction-finding (DF) techniques in the digital domain to monitor and control UAVs to avoid collisions of the UAVs with other UAVs or other things.

The radar antenna system may comprise: a first omnidirectional antenna; and a second omnidirectional antenna, which is located coaxially above or below the first omnidirectional antenna and separated therefrom at a predefined distance D. The first omnidirectional antenna and second omnidirectional antenna may comprise a continuous multimodal and omnidirectional antenna or a discrete multimodal and omnidirectional antenna.

Each of the elements of the first omnidirectional antenna and the second omnidirectional antenna may be configured to receive and/or transmit radio frequency (RF) signals by connection to a respective receive and/or transmit (Rx/Tx) module.

Each of the Rx/Tx modules allows excitation of microwave signals in each respective antenna element resulting in radiated energy at a predefined direction. Each of the Rx/Tx modules may also be excited simultaneously with any other of the Rx/Tx modules to thereby excite several antenna elements so as to steer the radiated energy into one or several predefined directions.

The radiated energy signal waveform may be selected from, but not limited to: (i) a radio frequency (RF) pulse; (ii) a RF pulse with linear frequency modulation (LFM); (iii) continuous frequency modulation (FMCW); (iv) unique waveform so as to distinguish between other radar systems. Some examples for unique waveforms may be Barker-codes; or (v) a signal pattern so as to properly query and interrogate the transponders located on the UAVs.

The energy reflected off the UAVs is received by the antenna elements and the Rx/Tx modules. The received RF signal is downconverted to an intermediate frequency (IF) signal, preferably by mixing with a local oscillator (LO) signal, where the receiving channels are homodyne receivers of any implementation or heterodyne receivers of any implementation. Preferably, the Rx/Tx modules include signal conditioning elements such as amplifiers and/or filters and/or power-limiters and/or phase shifters and/or couplers, et cetera.

The IF signals are processed so as to infer the bearing, i.e., the azimuth and elevation, of the impinging reflected RF signal.

Each one of the IF signals is digitized. The digitizers are analog-to-digital converters (ADCs). The ADCs are preferably located on the digital-signal-processing card (DSPC) but may also be located on the Rx/Tx modules. In the latter case, the digitized data is fed from the Rx/Tx modules into the DSPC.

The DSPC performs the data processing for detection and identification and tracking of one or more UAVs.

The DSPC may be comprised of signal conditioning elements such as amplifiers and/or filters and/or power-limiters and/or phase shifters and/or couplers et cetera. The DSPC may further be comprised of a digital signal processor (DSP) and/or programmable logic device and/or microprocessor and/or microcontroller and/or memory unit, et cetera.

The digitized IF signals received at the first omnidirectional antenna are processed so as to form modal beams with opposite phase slopes by complex weighting each digitized input and summing the weighted digitized signals.

For example, for an equispaced array of N elements or feeds, the complex weights are given by:

$$w_{(i)} = e^{\pm j\frac{2\pi Mi}{N}}$$

where w(i) are the complex weights, $j=\sqrt{-1}$, M=(0, 1, 2 . . . ) is the phase slope, i is the module index and the (±) sign determines the slope direction, namely positive or negative.

The complex weights may be programmed so as to produce any antenna array spatial pattern. The spatial patterns can be any of an omnidirectional pattern, steered directional beam, a spatial null (or several nulls) pointed to undesired reception directions.

The digitized IF signal received at the second omnidirectional is processed as to form a phase reference signal.

The LO signal source is preferably generated in the exciter module. Preferably, the exciter module further includes a distribution mechanism for distributing the LO signal to the Rx/Tx modules. Preferably, the distribution mechanism includes signal conditioning elements such as power dividers and/or power combiners and/or frequency control mechanism and/or pulsing mechanism and/or amplifiers and/or filters and/or phase shifters and/or couplers, et cetera. The LO signal source may also be located on the Rx/Tx modules. In the latter case, the Rx/Tx module may further include a frequency control mechanism and/or pulsing mechanism and/or amplifiers and/or filters and/or phase shifters and/or couplers et cetera.

The Tx signal is preferably generated in the exciter module. Preferably, the exciter module further includes a distribution mechanism for distributing the Tx signals for the Rx/Tx modules. Preferably, the distribution mechanism includes signal conditioning elements such as power dividers and/or power combiners and/or frequency control mechanism and/or pulsing mechanism and/or amplifiers and/or filters and/or phase shifters and/or couplers, et cetera. The Tx signal source may also be located on the Rx/Tx modules. In the latter case, the Rx/Tx module may further include a frequency control mechanism and/or pulsing mechanism and/or amplifiers and/or filters and/or phase shifters and/or couplers et cetera The timing and clocking signals are preferably generated in the exciter module. The exciter module further includes a distribution mechanism for distributing the timing and clocking signals to other modules in the system. Preferably, the distribution mechanism includes signal conditioning elements such as power dividers and/or power combiners and/or frequency control mechanism and/or pulsing mechanism and/or amplifiers and/or filters and/or phase shifters and/or couplers, et cetera. The timing and clocking signals may also be located on the DSPC. In the latter case, the DSPC module further includes a distribution mechanism for distributing the timing signals to other modules in the system. Preferably, the distribution mechanism includes signal conditioning elements such as power dividers and/or power combiners and/or frequency control mechanism and/or pulsing mechanism and/or amplifiers and/or filters and/or phase shifters and/or couplers, et cetera.

The improved performance of the present invention over the prior art includes:
1. creating 3D radar using Multimodal and Interferometer techniques;
2. better bearing measurement accuracy and stability, due to elimination of errors introduced by other analog methods and means;
3. reduced system complexity and enhanced system modularity due to elimination of other analog methods and means;
4. implementability of other DOA methods;
5. monitoring the aerial environment for detection and tracking of UAVs;
6. coverage of each UAV by several radars to thereby enhance performance by smooth handover and continuous tracking;
7. decrease false alarm incidences;
8. allows the flexibility of adjusting the transmission power;
9. allows the flexibility of different waveforms;
10. help avoid over-interrogation of the transponder located on the UAVs;
11. communicate or query onboard transponders in order to identify a UAV;
12. the radar system is of a small form factor compared to known dimensions of common radar systems that provide azimuthal coverage from 0° to 360° within a predefined range of elevations below and above the horizon;
13. the radar physical dimensions make it perfectly suited for rapid deployment and easy installation; and
14. state authorities such as FAA in the U.S. and other law-enforcement authorities may have direct access to the data cloud and grid therefore are able to communicate, identify, and provide immediate notification and instructions to one or several UAVs simultaneously in order to deviate UAV traffic and even jam a UAV.

BRIEF DESCRIPTION OF DRAWINGS

FIG. 3 shows an illustration of a UAV seen in perspective top view illustratively equipped with GPS receiver and a transponder;

DETAILED DESCRIPTION

Figure 1:
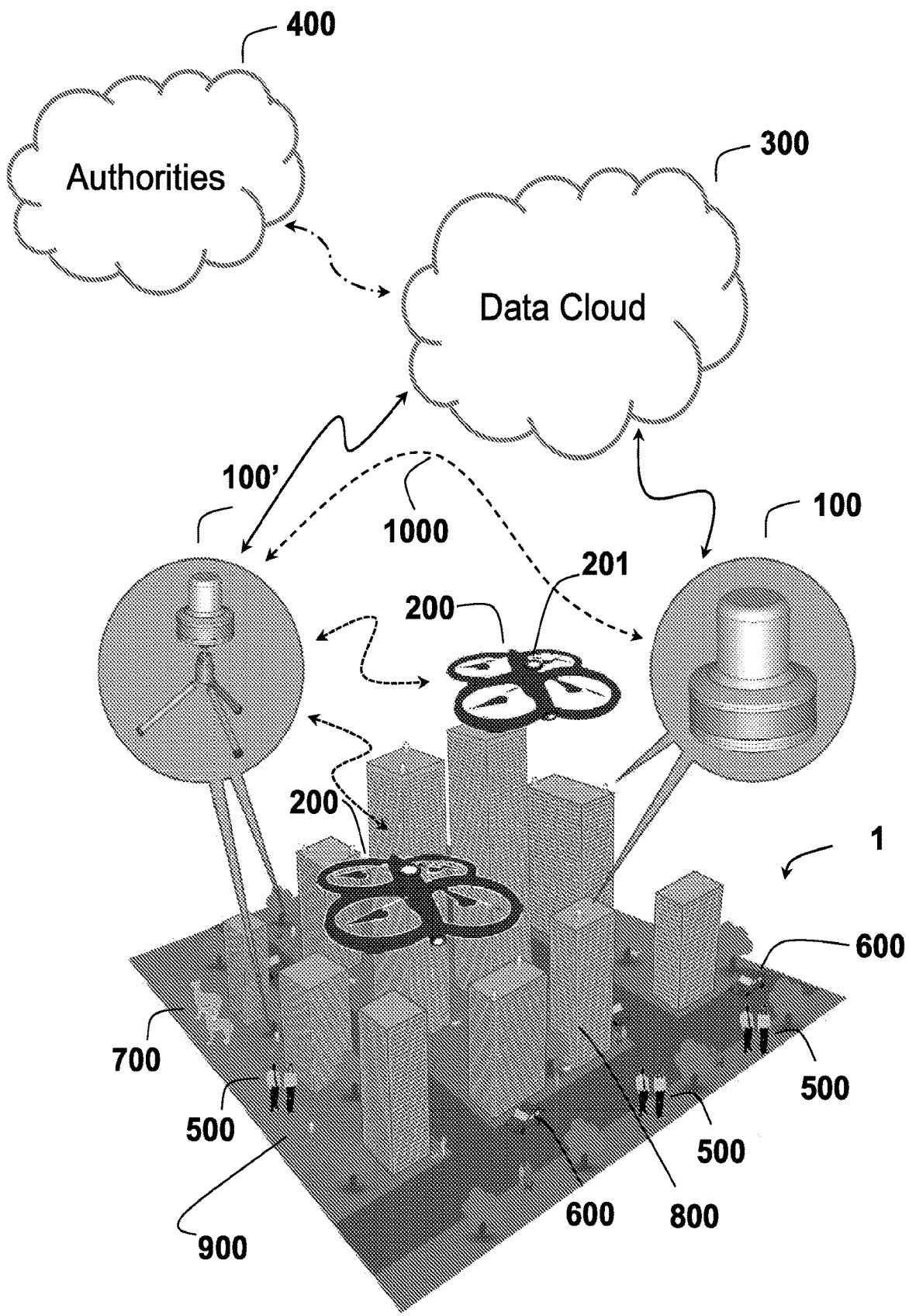
FIG. 1 is a scheme showing, according to an exemplary embodiment of the invention, an urban area with hovering unmanned aerial vehicles (UAVs) and a grid of 3D radar systems connected to a data cloud, where the data cloud may also be accessed by official authorities.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without limiting the scope of the present invention.

A 3D radar system for aerial traffic monitoring of unmanned aerial vehicles (UAVs), which addresses the technical problems of: (i) lack of an efficient mean for monitoring UAVs aerial traffic, namely, the ability to detect, track, and spatially locate one or more flying UAVs, at real time, and (ii) controlling the flying routes of UAVs, while taking into consideration, at every given moment, the spatial location of other objects flying in the UAV's immediate vicinity or objects erecting from the ground so as in times of emergency, immediate notification and instructions may be provided to one or several UAVs simultaneously in order to deviate UAV traffic.

The radar system described herein is of small form factor compared to known dimensions of common radar systems and characterized by low radiated power so as to comply with urban safety regulations. The radar system is designed to allow rapid deployment and easy installation.

The radar system provides azimuthal coverage from 0° to 360° within a predefined range of elevations below and above the horizon. The range of elevations may be, for example, from −45° to 45° elevation below and above the horizon, respectively, enabling coverage of blind zones thereby assuring detection and tracking in high density or compact environment.

According to some embodiments of the invention, there is provided a radar system covering azimuth from 0° to 360° within a predefined range of elevations below and above the horizon, comprising an antenna system for estimating the DOA, such as but not limited to, the antenna system described in U.S. Pat. No. 8,334,808, which is incorporated herein by reference as if fully disclosed herein. The range of elevations may be, for example, from −45° to 45° elevation below and above the horizon, respectively.

The radar system method for inferring the direction-of-arrival (DOA) of reflected signals incorporates the multimodal and interferometer direction-finding (DF) techniques in the digital domain. The radar antenna system may include a first omnidirectional antenna and a second omnidirectional antenna, which is located coaxially above or below the first omnidirectional antenna and separated therefrom at a predefined distance. Each of the elements of the first omnidirectional antenna and the second omnidirectional antenna is directly connected to a Receive and/or Transmit (Rx/Tx) module allowing each of the elements to be configured to transmit and receive radio frequency (RF) signals. Each of the Rx/Tx modules allows excitation of microwave signals in each respective antenna element resulting in radiated energy at predefined direction where each of the Rx/Tx modules may also be excited simultaneously with any other of the Rx/Tx modules thereby excite several antenna elements so as to steer the radiated energy into one or several predefined directions. The energy reflected off an object is received by the antenna elements and the Rx/Tx modules downconvert the received RF signal to an intermediate frequency (IF) signal, preferably by mixing with a local oscillator (LO) signal. The receiving channels of the Rx/Tx modules are homodyne receivers of any implementation or heterodyne receivers of any implementation. Preferably, the Rx/Tx modules include signal conditioning elements such as amplifiers and/or filters and/or power-limiters and/or phase shifters and/or couplers, et cetera.

Each one of the IF signals is digitized in a respective analog-to-digital converter (ADC). The ADCs are preferably located on the DSPC but may also be located on the Rx/Tx module. In the latter case, the digitized data is fed into the DSPC. The digitized IF signals received at the first omnidirectional antenna are processed so as to form modal beams with opposite phase slope by complex weighting of each digitized input and summing the weighted digitized signals.

For example, for an equispaced array of N elements or feeds, the complex weights are given by:

$$w_{(i)} = e^{\pm j \frac{2\pi M i}{N}}$$

where $w(i)$ is the complex weight, $j=\sqrt{-1}$, $M=(0, 1, 2 \ldots )$ is the phase slope, $i$ is the module index and the $(\pm)$ sign determines the slope direction, namely positive or negative.

In a case of modal beams of the first order with opposite phase slopes of $(−1, +1)$, hence $M=1$, the positive modal beam is the sum:

$$S_{(+1)} = \frac{1}{\sqrt{N}} \sum_{i=0}^{N-1} s_i(T) e^{+j\frac{2\pi i}{N}}$$

and the negative modal beam of the first order is:

$$S_{(-1)} = \frac{1}{\sqrt{N}} \sum_{i=0}^{N-1} s_i(T) e^{-j\frac{2\pi i}{N}}$$

where $s_i(T)$ is the digitized received data from the first omnidirectional antenna.

The digitized IF signal received at the second omnidirectional antenna is processed so as to form a reference signal $S_{REF}$ of a reference phase such as having a phase-slope of zero.

The DSPC allows the extraction of first phase difference between the phase of the first signal and the reference phase, and a second phase difference between the phase of the second signal and the reference phase. Each phase difference includes a first component proportional to the azimuth of the arriving signal and a second component corresponding to the elevation of the arriving signal, from which the azimuth and the elevation of the arriving signal can be extracted.

The output signals of first omnidirectional antenna may be processed to include at least two of: first-order signal of a positive phase slope (+1), first-order signal of a negative phase slope (−1), second-order signal of a positive phase-slope (+2), and/or second-order signal of a negative phase-slope (−2), wherein at least two of the processed signals are of the same order and at least one of the processed signals is of the first order.

According to some embodiments of the invention, the radar is designed to operate in the industrial, scientific and medical (ISM) frequency radio bands as defined by the Constitution and Convention of the International Telecommunication Union (ITU Constitution and Convention). For example, In the United States, uses of the ISM bands are governed by Part 18 of the Federal Communications Commission (FCC) rules, while Part 15 contains the rules for unlicensed communication devices, even those that share ISM frequencies. In Europe, the ETSI is responsible for governing ISM bands.

Reference is now made to FIG. 1 which schematically illustrates, according to some embodiments of the invention, an urban area 1 and radar systems 100 and 100' positioned on roof tops of buildings 800 and on the ground surface 900, respectively. The radar systems 100 and 100' are monitoring the aerial environment for detection of hovering UAVs 200. The UAVs may be for military and civil applications, including, target and decoy, reconnaissance, combat, surveillance, delivery and commercial applications. Furthermore, UAVs may also be fixed wing, hybrid vehicle, or rotorcraft where rotorcraft may be of a single-rotor, dual rotor, trirotor, quadrorotor (quadcopter), hexarotor, or octorotor design. The positioning of the radar systems 100 and 100' is obtainable due to the fact that each radar system provides azimuthal coverage from 0° to 360° within a predefined range of elevations below and above the horizon. The range of elevations may be, for example, from −45° to 45° elevation below and above the horizon, respectively, enabling coverage of blind zones thereby assuring detection and tracking in high density or compact environment. The 3D coverage allows the radar to distinguish between aerial vehicles to other objects such as human 500, vehicles 600 or animals 700.

According to this embodiment, the radar systems 100 and 100' are operatively connected to one another in a grid 1000 so that they are capable of communicating with each other so as to obtain smooth handover and continuous tracking of UAVs 200 and decrease false alarm incidences. For ease of depiction, only two radar systems 100 and 100' are shown; however, more radar systems can be including in the grid 1000, as needed. The radar systems 101 and 100' allow querying and interrogating on-board transponder 202 of the UAVs 200. In response to the query, the transponder 202 on each active UAV in the area transmits a unique identifier to the radar systems 100, 100' according to the present invention.

The radar systems are connected to a data cloud 300 that keep track of the UAVs 200, so as to allow online and real time situational awareness of UAVs 200 aerial traffic, aerial traffic load, aerial collision predictions, et cetera. The data cloud comprises at least a non-transitory memory (not shown) storing data cloud software and a database comprising information regarding the identity of the identified UAVS and the location thereof as determined by the calculated DOA, and a processor 330 (see, e.g., FIG. 2) for processing the data and executing the software stored in the non-transitory memory. The database storing identified UAVs and the location of those UAVs in the data cloud software may be accessed directly by state authorities data systems 400 such as the FAA in the U.S. and other law-enforcement authorities and is able to communicate, identify, in times of emergency provide immediate notification and instructions to one or several UAVs simultaneously in order to deviate the UAV traffic and even jam UAVs to avoid collisions.

Figure 2:
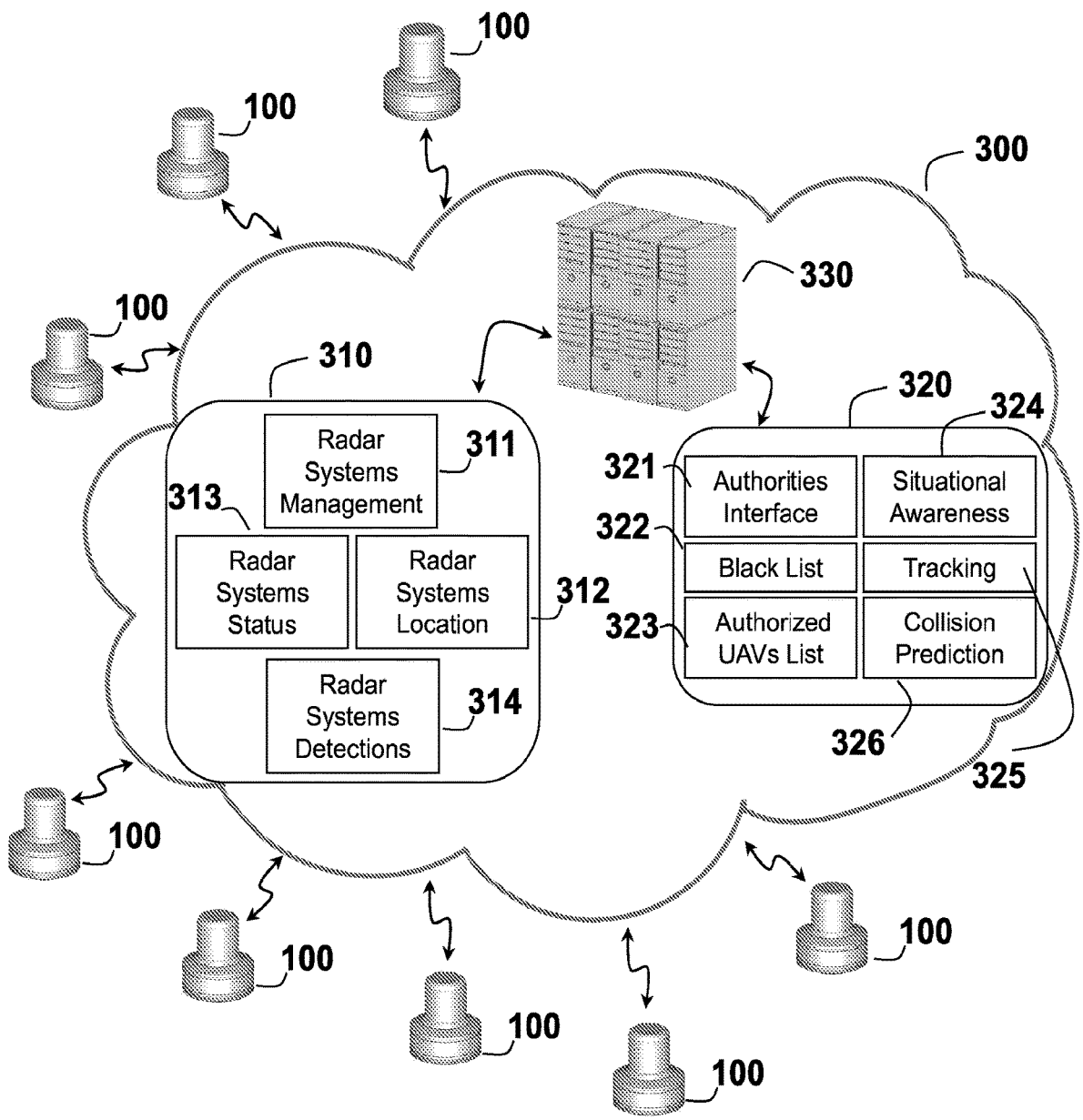

Reference is now made to FIG. 2 which schematically illustrates, according to some embodiments of the invention, an exemplary data cloud configuration. The data cloud is comprised of one or several computational units 330 executing the cloud software comprised of several processes where some of the processes, but not limited to, are processes relating to the radar systems 310 and the actual aerial monitoring processes 320. The processes relating to the radar systems 310 may comprise a process for radar system management 311 that is responsible for carrying out communication with the radar systems in the grid, determining which of the radar systems is a master system, et cetera. The processes relating to the radar systems 310 also keep track and record of radar systems status and operational status 313, keep track and record of radar systems locations 312 and keep tracks and records of all reported radar systems detections 314. The actual aerial monitoring processes 320 may be comprised of several processes such as, but not limited to, a black list 322 and an authorized UAVs list 323. Black list 322 may be a list of UAVs that, for example, are not authorized to fly in a specific area. An authorized UAVs list 323 may be a list of UAVs that, for example, are permitted to fly in a specific area. The black list 322 and authorized UAVs list 323 are stored on a non-transitory memory that is part of the computational units 330 (not seen). The black list 322 and authorized UAVs list 323 may be received by the relevant national authorities such as the U.S. federal aviation administration (FAA) updated from time to time. The connection between the data cloud and the relevant national authorities may be performed by a secure connection established by the Authorities interface process 321. Another aspect of the situational awareness is comprised of the tracking 325 and collision prediction process 326. This process may access all relevant data and other processes such as radar system detection 314, tracking 325, et cetera. For example, the collision prediction process 326 may issue an immediate alert to relevant national authority in cases where it is determined that collision between UAVs or other aerial vehicles might happen. The process 326 determines that collisions may occur, for example, based on location of the UAV(s) and the various objects in the area of the location of the UAVs, speed of movement of the UAV, and direction of movement of the UAV(s).

Figure 3:
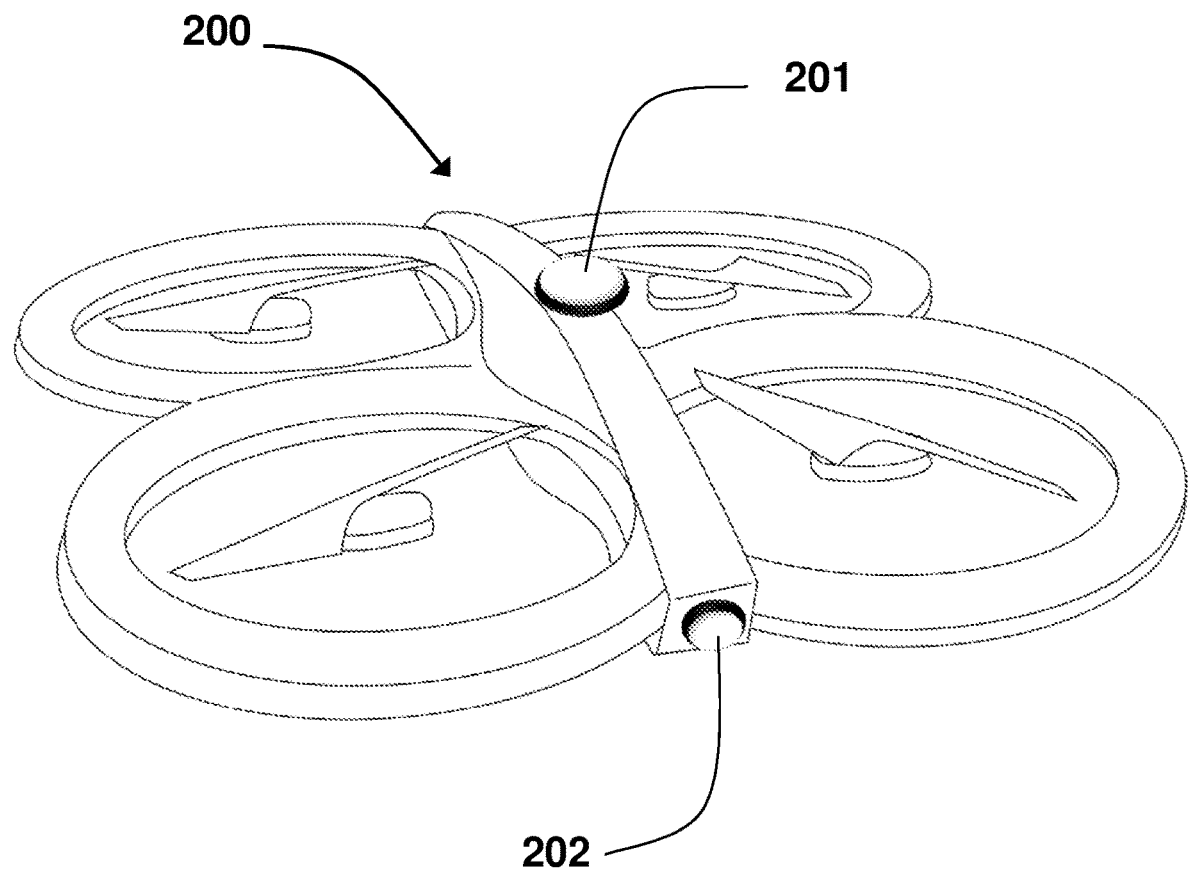
FIG. 3 shows an illustration of a data cloud according to an exemplary embodiment of the invention.

Reference is now made to FIG. 3 which schematically illustrates, according to some embodiments of the invention, in perspective top view, a UAV 200 and depicted global positioning system (GPS) antenna 201 positioned on top. Also depicted in this figure is the transponder 202 located on the side of the UAV 200.

Figure 3A:
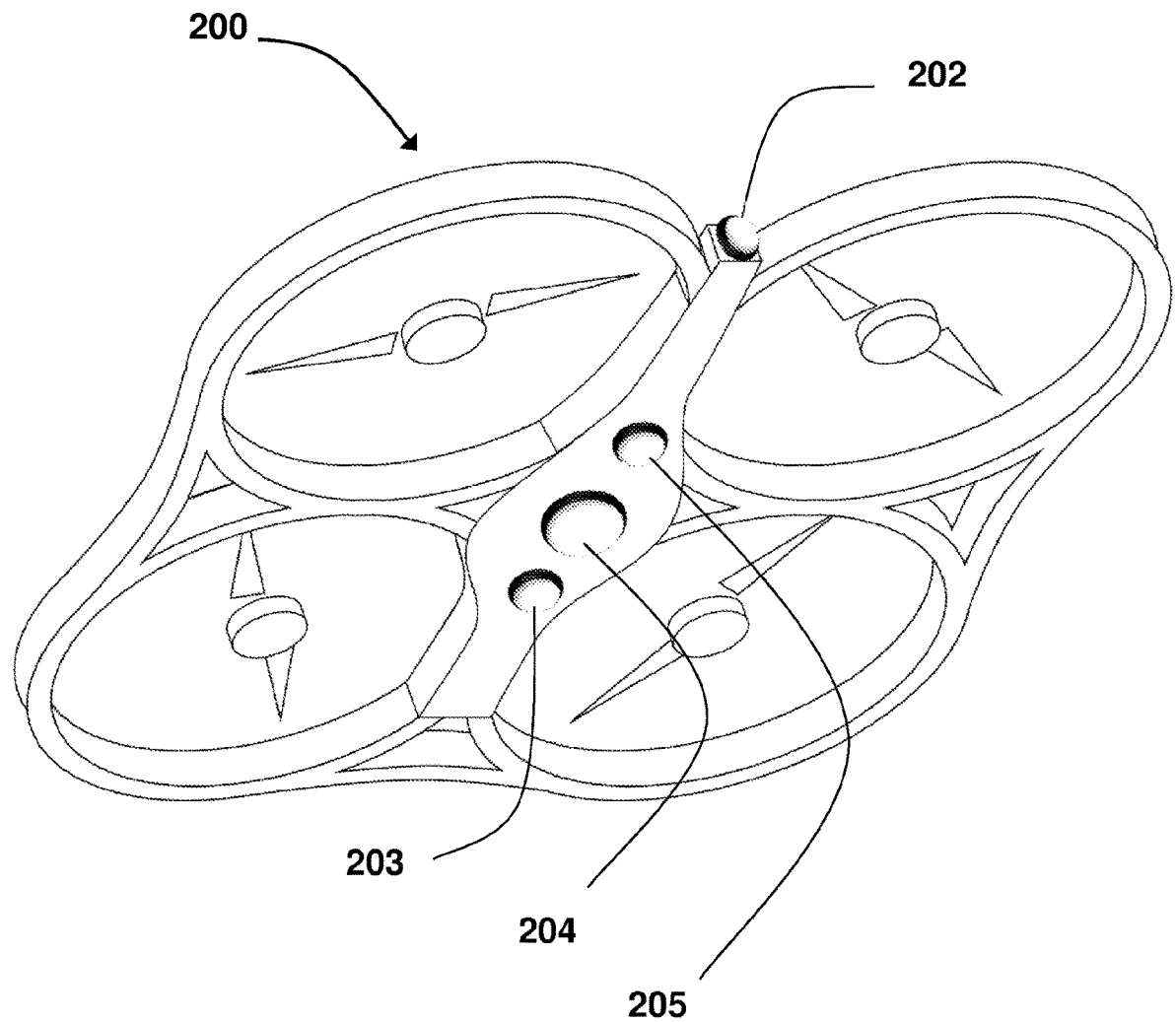
FIG. 3a shows an illustration of a UAV seen in perspective bottom view illustratively equipped with transponder, cellular module and INS module.

Reference is now made to FIG. 3A which schematically illustrates, according to some embodiments of the invention, in perspective bottom view, a UAV 200 and depicted in this figure is the transponder 202 located on the side of the UAV 200. Also depicted in this figure are a transmitter 205, a cellular communication module 204 and INS module 203.

Figure 4:
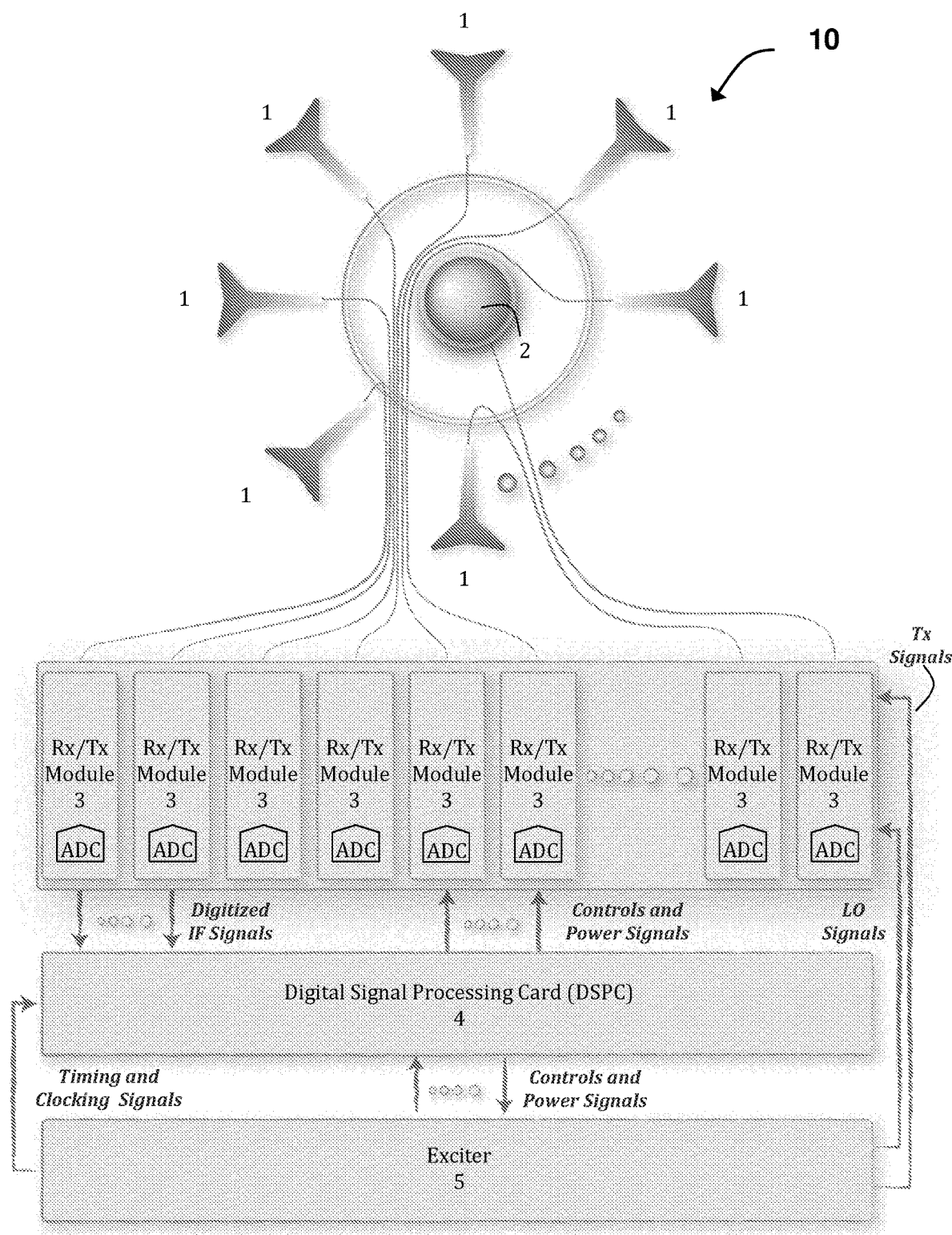
FIG. 4 shows a first embodiment of the radar system in the present invention where the local-oscillator (LO) signals, transmit (Tx) signals and timing and clocking signals are generated in the exciter and the analog-to-digital converters (ADCs) are located on the receive and/or transmit (Rx/Tx) module.
Figure 5:
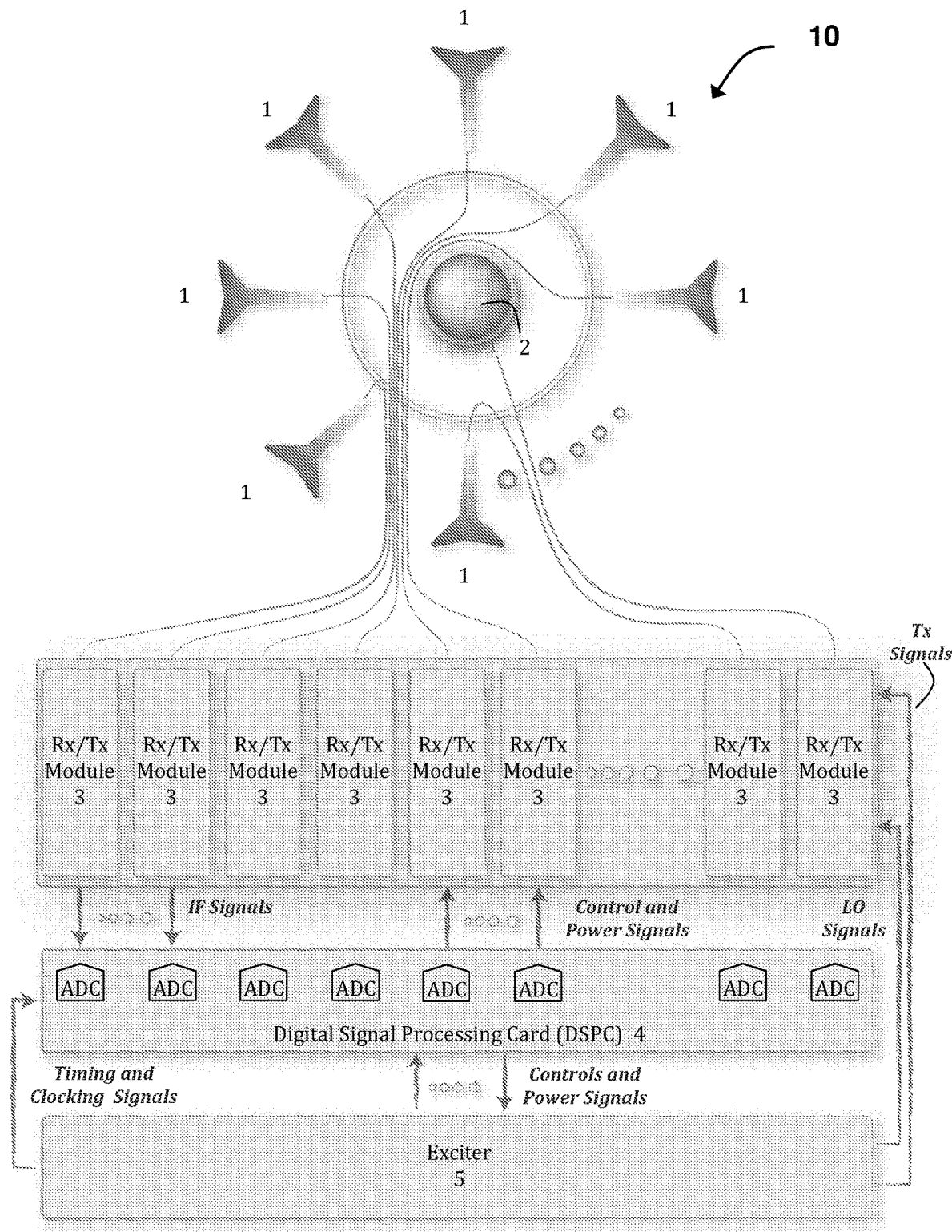
FIG. 5 shows a second embodiment of the radar system in the present invention where the LO signals, Tx signals and timing and clocking signals are generated in the exciter and the ADCs are located on the digital-signal-processing card (DSPC) module.

Reference is now made to FIG. 4-5, which schematically illustrate embodiments of the radar system comprising an arbitrary number of elements 1 preferably but not necessarily equispaced around a circle or around a portion of a circle so as to form the first omnidirectional antenna 10. The system also includes a second omnidirectional antenna 2. The first omnidirectional antenna 10 and second omnidirectional antenna 2 may comprise a continuous multimodal and omnidirectional antenna or a discrete multimodal and omnidirectional antenna. In embodiments where the first omnidirectional antenna comprises a plurality of discrete multimodal antennas, the discrete multimodal antennas may form a circular antenna array, wherein at least a portion of elements in the plurality of discrete antenna elements comprises dipole, biconical dipole, monopole, conical monopole, patch, tapered slot-line, radial parallel, and/or horn antenna elements.

The second omnidirectional antenna may be one of: a dipole antenna, a biconical dipole antenna or a radial parallel-plate antenna wherein the plates may flare apart at some distance as in a biconical horn antenna. In the case where the second omnidirectional antenna is a dipole antenna or a biconical dipole antenna it may feed a coaxial transmission line or a balanced transmission line that directly connects the second omnidirectional antenna to an Rx/Tx module 3.

According to this embodiment of the invention, the Tx signals are generated on the exciter module 5 and are directly fed to the Rx/Tx modules 3. The exciter 5 allows generating the Tx signals with several waveforms selected from, but not limited to: (i) a radio frequency (RF) pulse; (ii) a RF pulse with linear frequency modulation (LFM); (iii) continuous frequency modulation (FMCW); (iv) unique waveform so as to distinguish between other radar systems. Some examples for unique waveforms may be Barker-codes; or (v) a signal pattern so as to properly query and interrogate the transponders located on the UAVs.

Each of the Rx/Tx modules 3 downconvert the received RF signal to IF signals, preferably by mixing with a LO signal, where the receiving channels are homodyne receivers of any implementation or heterodyne receivers of any implementation. Each one of the IF signals is digitized by a respective one of the ADCs 104a (see, e.g., FIG. 9).

FIG. 4 illustrates an embodiment where the digitizers (ADCs) are located on the Rx/Tx modules 3 and FIG. 5 illustrates an embodiment where the digitizers are located on the DSPC 4.

Figure 6:
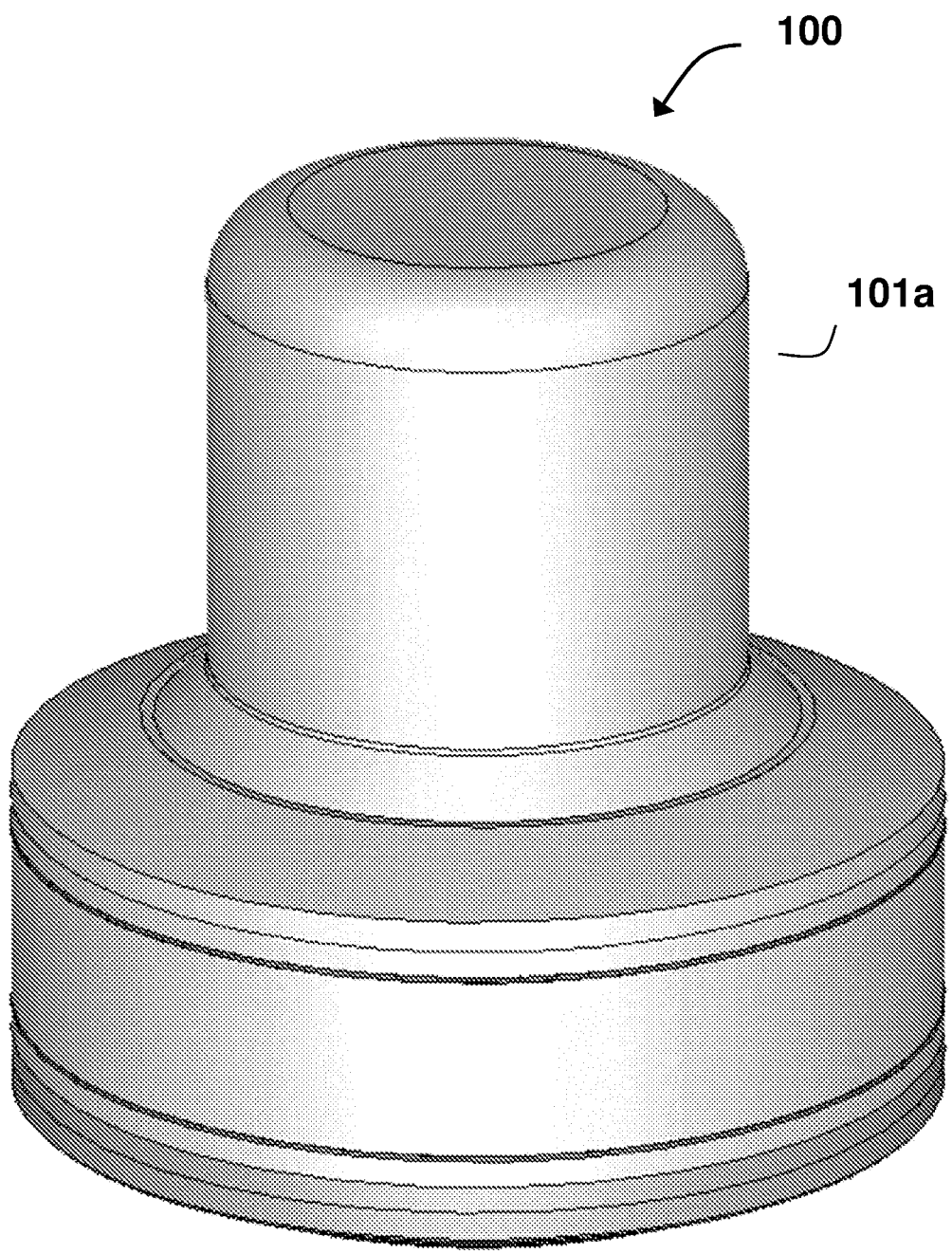
FIG. 6 shows one embodiment of the radar system where the radar is placed inside a radome.

Reference is now made to FIG. 6 which schematically illustrates, according to some embodiments of the invention, one embodiment of the radar system 100 and the antenna radome 101a. According to some embodiments of the invention, the radome 101a may embed a polarizer within it (not seen) resulting with polarized radiated energy. The polarization of the radiated energy results with better isolation between energy radiated by other adjacent radar system hence interference between adjacent radar systems are reduced dramatically. Typical isolation achieved is in the order of 30 dB. This allows each radar system a better distinction between the energy it transmitted and reflected-off the UAVs than energy transmitted by other systems and a portion of the reflected-off a UAV energy impinged it.

Figure 7:
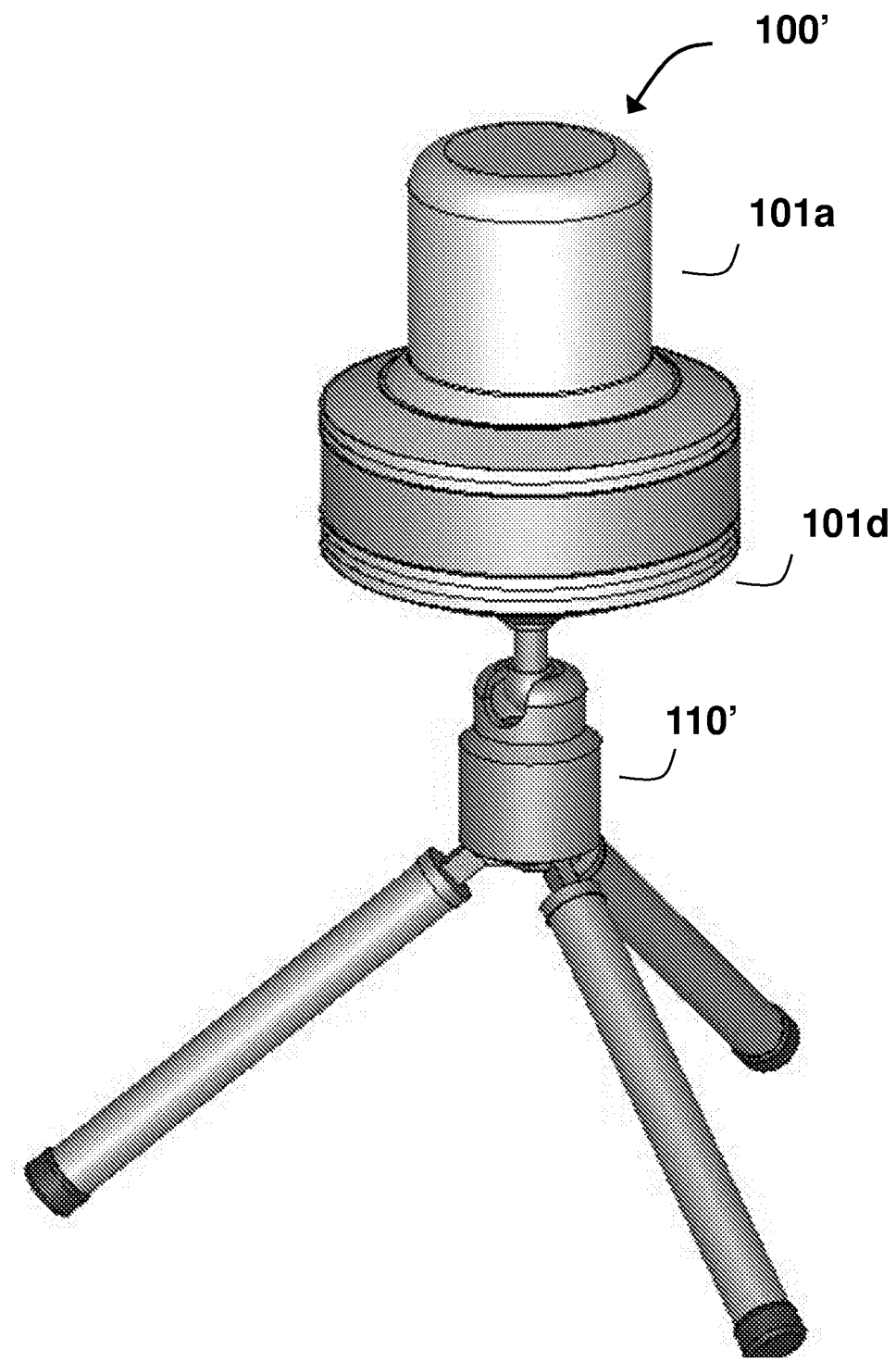
FIG. 7 shows one embodiment of the radar system where the radar is placed inside a radome mounted on a tripod.

Reference is now made to FIG. 7 which schematically illustrates, according to some embodiments of the invention, one embodiment of the radar system 100'. This embodiment illustrates the radar system 100 (see, e.g., FIG. 6) mounted on a commercially available tripod 110'.

Figure 8:
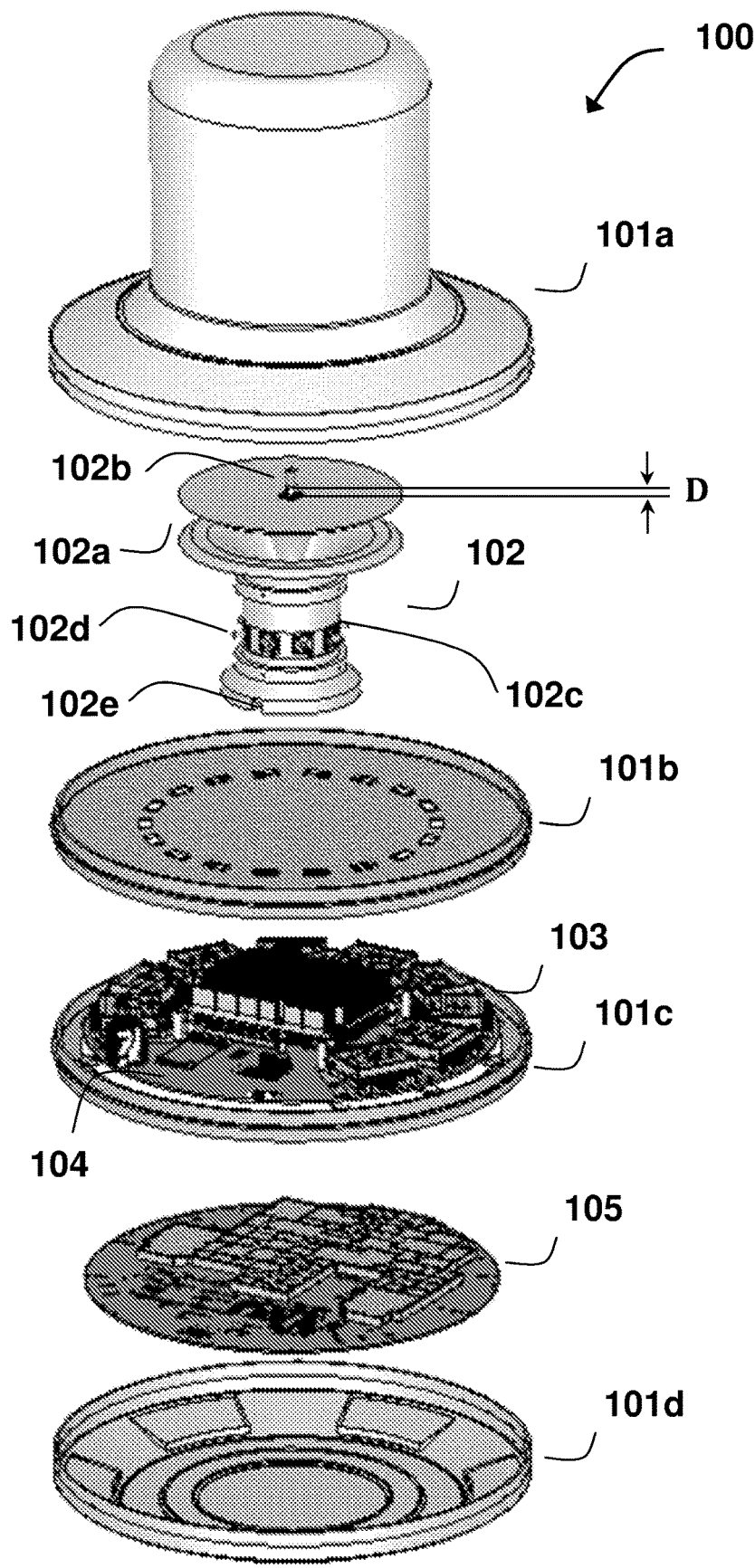
FIG. 8 shows the embodiment seen in FIG. 5 in exploded view.

Reference is now made to FIG. 8 which schematically illustrates, according to some embodiments of the invention, one embodiment of the radar system 100, in exploded view. Other configurations of the radar system 100 are possible. According to this embodiment of the invention, the antenna system 102 is located under the radome top cover 101a. The antenna system in this embodiment is a biconical horn antenna 102a and a monopole 102b located coaxially above it at a distance D. The distance D may be up to several $\lambda$ where $\lambda$ is the wavelength of the center operating frequency. The biconical horn 102a is fed by an overmoded circular coaxial waveguide (CWG) 102c and fed by feeds 102d located close to the bottom around the circumference. CWG 102c may have dimensions corresponding to the operating frequency range. For a frequency range of wavelengths range $\lambda_{fmax} < \lambda < \lambda_{fmin}$, the CWG 102c is designed to allow the propagation of the $TE_{11}$ and $TE_{21}$ modes, hence the diameter of the outer circumference of CWG 102c may be of the dimensions of $d1 = \lambda_{fmin}$. The location of feeds 102d is set to about $\frac{1}{4}\lambda_{fmin}$. The monopole antenna 102b is fed by a coaxial transmission line 102e located at the bottom of the biconical horn antenna 102a.

The antenna system 102 is placed on top of a support plate 101b. The DSPC 104 in this embodiment is placed underneath the support plate 101b. The Rx/Tx modules 103 are placed around the perimeter of the DSPC 104. The DSPC 104 is supported by support plate 101c preferably made of a heat conducting material such as aluminum. By that construction, not only does the support plate 101c allow for good mechanical structure but it also allows for heat dissipation from the center of the DSPC 104 module towards the outer environment.

Also according to this exemplary embodiment, the exciter 105 is located underneath the DSPC 104 and the support plate 101c and is hooked to the bottom of the radome structure 101d. Other configurations are possible.

Figure 9:
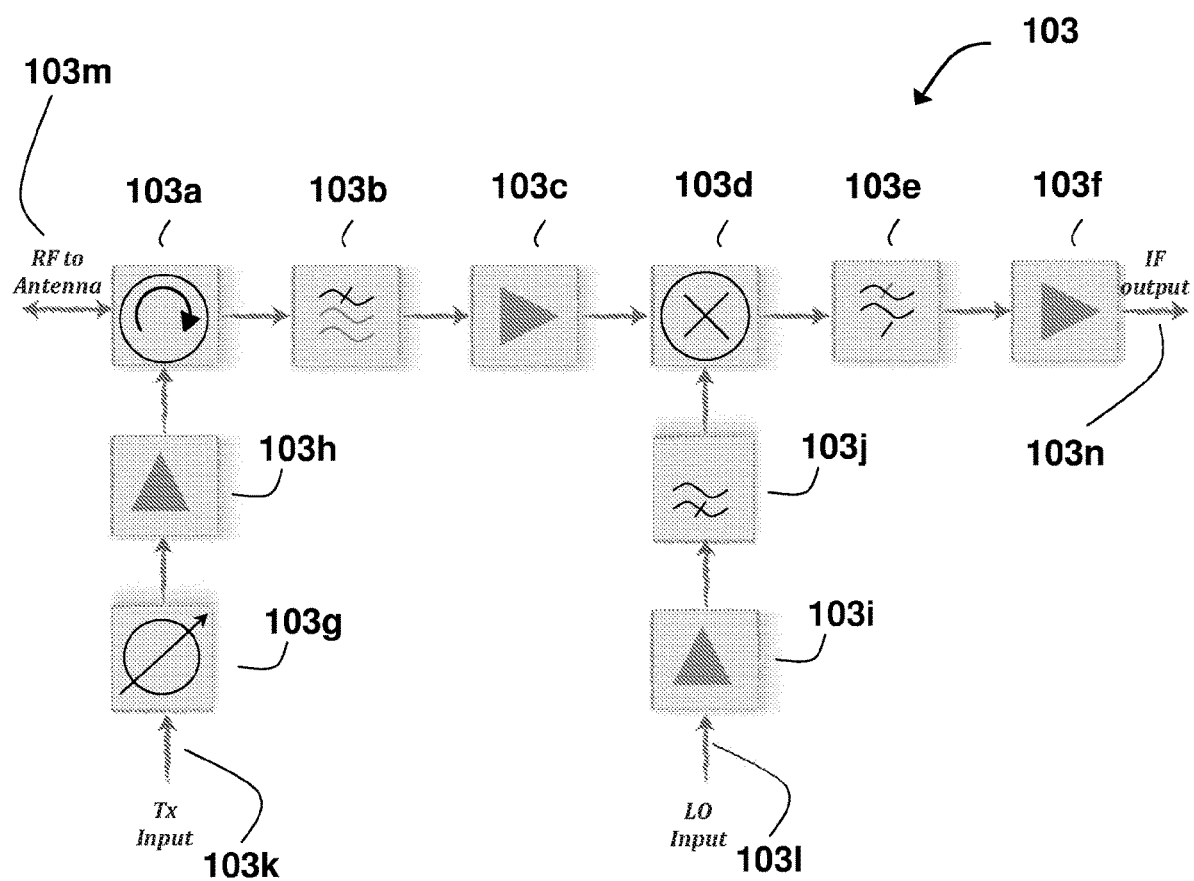
FIG. 9 shows, according to some embodiments of the invention, one embodiment of the Rx/Tx module according to the embodiment illustrated in FIG. 4.

Reference is now made to FIG. 9 which schematically illustrates, according to some embodiments of the invention, one embodiment an Rx/Tx module 103. Other configurations of the Rx/Tx module 103 are possible. Each Rx/Tx module is directly connected to one of the feeds of the first omnidirectional antenna or to the feed of the second omnidirectional antenna at the RF to antenna port 103m. The Tx signal excited at the "Tx input" port 103k is phase shifted by a controlled phased shifter 103g. The phase shift may be performed independently from other the Rx/Tx modules so as to obtain steering of the radiated energy into one or several predefined directions. The phase shifted signal is then amplified and directed toward the "RF to antenna" port 103m through the circulator 103a. A received signal is passed through the circulator 103a directed toward the first RF filter 103b. The signal is then amplified by RF amplifier 103c and downconverted into an IF signal at the RF-to-IF mixer 103d. The mixing is done with LO signal excited at "LO input" port 103l and amplified with LO RF amplifier 103i and filtered by RF LO filter 103j. The IF signal at the output of RF-to-IF mixer 103d is filtered with IF filter 103e so to reject LO leakages and amplified with IF amplifier 103f. The IF amplifier 103e output is connected to the "IF output" port 103n.

Figure 10:
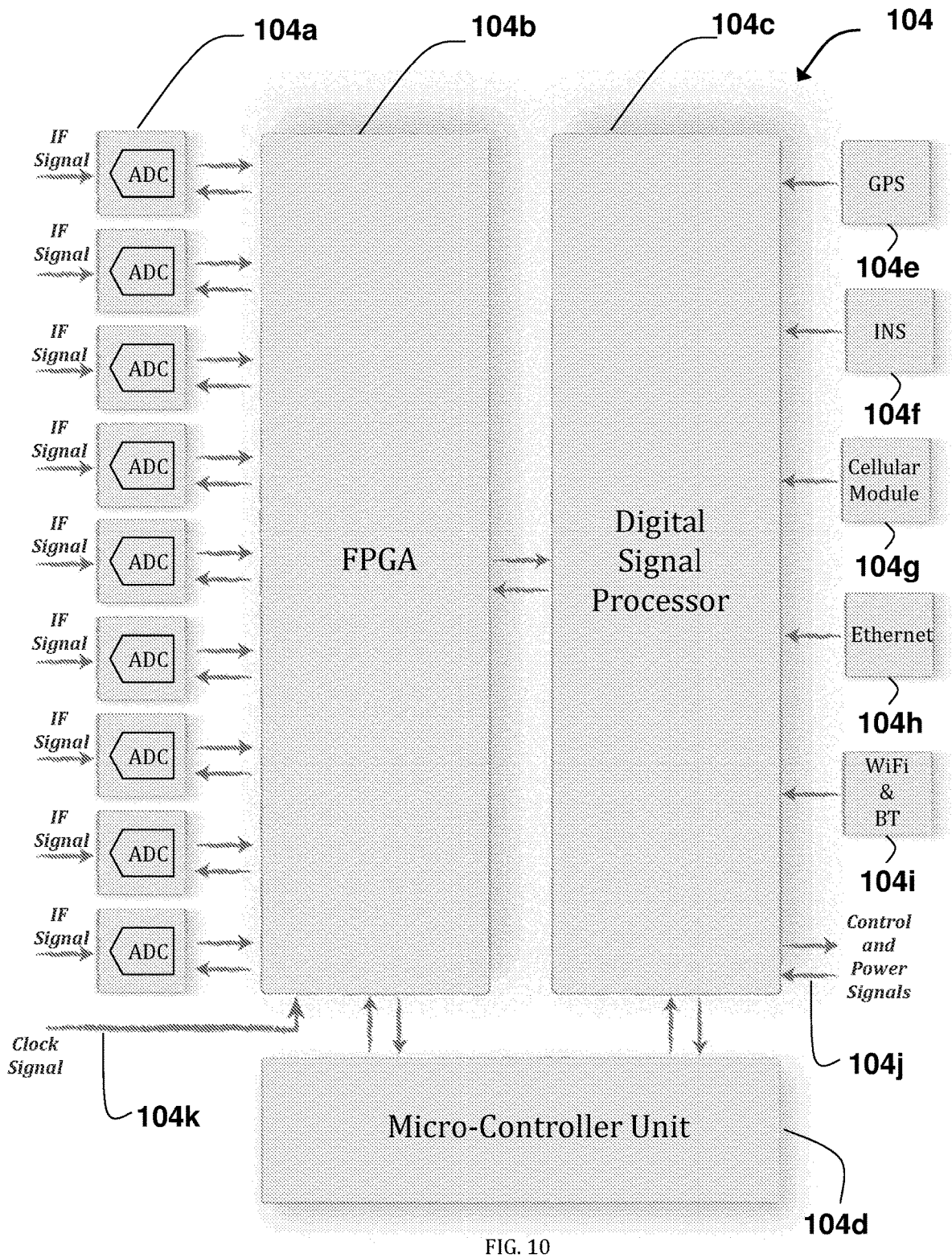
FIG. 10 shows, according to some embodiments of the invention, one embodiment of the DSPC module according to the embodiment illustrated in FIG. 4.

Reference is now made to FIG. 10 which schematically illustrates, according to some embodiments of the invention, one embodiment of the DSPC 104. Other configurations of the DSPC 104 are possible. The DSPC 104 is the computational and control unit of the system and according to this embodiment, the IF output of each Rx/Tx module is directly connected to an ADC 104a located on the DSPC 104. The ADC 104a outputs are connected to the programmable logic component field-programmable gate array (FPGA) 104b. The FPGA 104b multiplies each digital IF signal originally received by the first omnidirectional antenna with the appropriate complex weight (as described above) so as to digitally obtain the modal beams of the desired order and phase slopes. The digitized IF signal received by the second omnidirectional antenna is time-delayed so as to compensate for the time consumed by the complex multiplication process of the digitized IF signal received by the first omnidirectional antenna so as to transform the digitized IF signal received by the second omnidirectional antenna into a reference signal. The output signals of the desired modal order and phase slopes and the output reference signal are transferred from the FPGA 104b into the digital-signal-processor (DSP) 104c for further processing and radar calculations. According to this embodiment, the DSPC 104 further comprises a commercially available GPS module, for example NEO-M8M by Ublox 104e. The GPS module serves to determine the position of each radar system. According to this embodiment, the DSPC 104 further comprises a commercially available INS module 104f, for example BNO055 by Bosch. The DSP 104c access the INS module 104f so as to obtain real time physical position of the system and in case of need, to compensate for vibrations or tilting of the system due to winds or other causes resulted with physical displacement of the system. The connection to the data cloud 300 (see, e.g., FIG. 1) may be established by commercially available Ethernet controller chipset 104h, for example the X550 by Intel. The Ethernet controller 104h is located on the DSPC 104 and connected to the DSP 104c module. Another means of connection to the data cloud 300 (see, e.g., FIG. 1) may be by means of commercially available WiFi and/or Bluetooth modules 104i for example, the ODIN-W2 by Ublox. The WiFi and/or Bluetooth modules 104i may be located on the DSPC 104 and connected to the DSP 104c. The DSPC 104 further comprises a microcontroller unit (MCU) 104d that monitors voltages and temperature of the DSPC 104.

Figure 11:
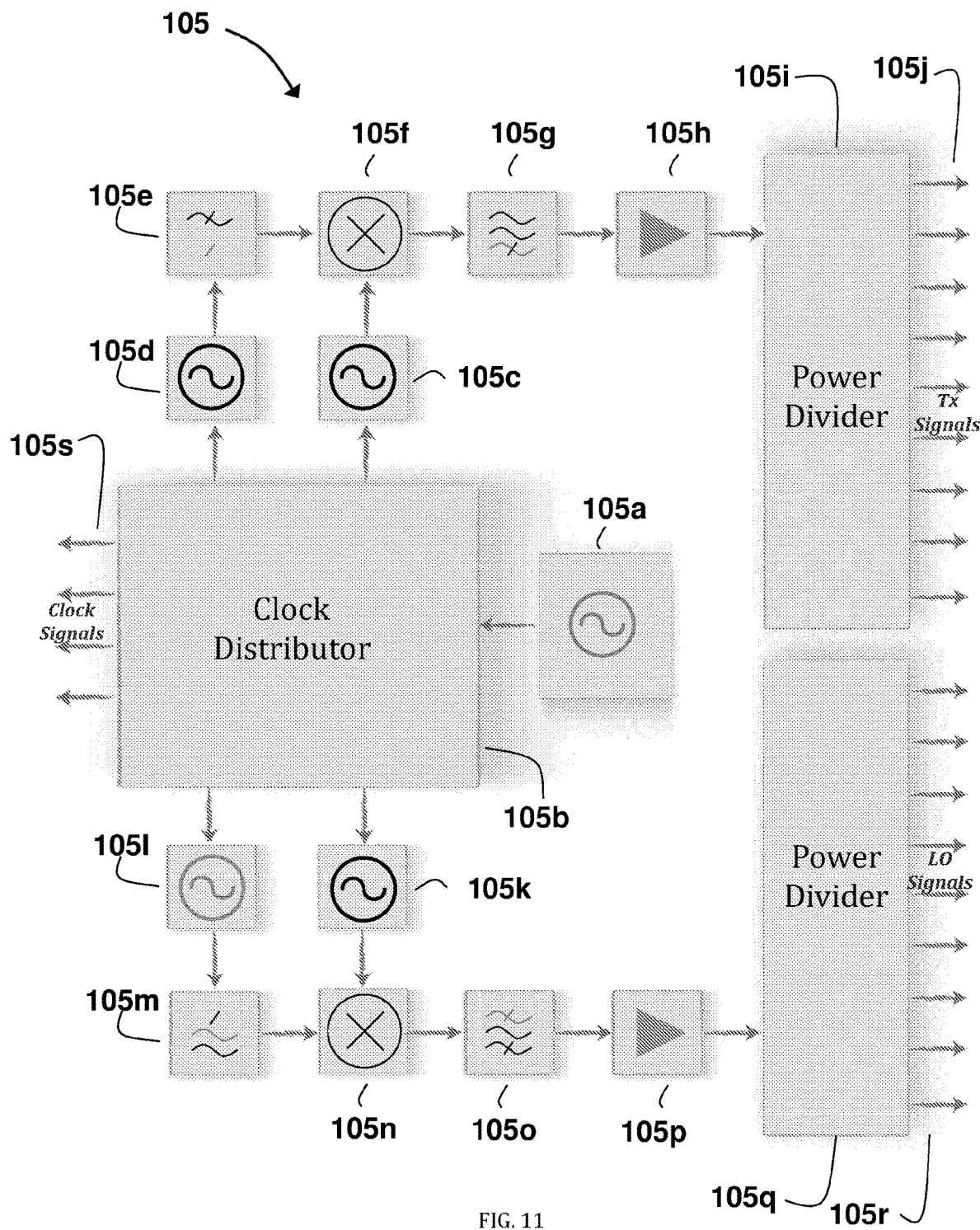
FIG. 11 shows, according to some embodiments of the invention, one embodiment of the exciter module according to the embodiment illustrated in FIG. 4.

Reference is now made to FIG. 11 which schematically illustrates, according to some embodiments of the invention, one embodiment of the exciter module 105. Other configurations of the exciter module 105 are possible. According to this embodiment, the exciter module 105 generates the clock signals in the system and also generates the Tx and LO signals. The exciter comprises a master oscillator 105a connected to a clock distributor module 105b. Some of the outputs 105s of the clock distributor module 105b are distributed to other consumers in the system, that is, the Rx/Tx modules, and the DSPC. Some of the outputs are connected to the Tx chain exciter module 105c and to the LO chain exciter module 105k. The output of the Tx chain exciter module 105c is connected to a RF mixer 105f. The RF mixer 105f up-converts the signal into required RF frequency by mixing the signal from the Tx chain exciter module 105c with the signal from the output of the filter 105e. The filter's 105e input is driven by a direct-digital-exciter (DDS) 105d. The DDS 105d is capable of generating the proper waveform required for transmission. The waveform may be selected from, but not limited to: (i) a radio frequency (RF) pulse; (ii) a RF pulse with linear frequency modulation (LFM); (iii) continuous frequency modulation (FMCW); (iv) unique waveform so as to distinguish between other radar systems. Some examples for unique waveforms may be Barker-codes; or (v) a signal pattern so as to properly query and interrogate the transponders located on the UAVs. The RF signal at the mixer's 105f output is filtered by RF Tx filter 105g. The filtered signal out of RF Tx filter 105g is amplified by RF amplifier 105h and directed toward RF Tx power divider 105i. The output ports 105j of the RF Tx power divider 105i are connected directly to each Rx/Tx module. The output of the LO chain exciter module 105k is connected to a RF mixer 105n. The RF mixer 105n up-converts the signal into required LO frequency by mixing the signal from the LO chain exciter module 105k with the signal from the output of the filter 105m. The filter's 105m input is driven by a DDS 105l. The DDS 105l is capable of generating the proper waveform required for transmission. The waveform may be selected from, but not limited to: (i) a radio frequency (RF) pulse; (ii) a RF pulse with linear frequency modulation (LFM); (iii) continuous frequency modulation (FMCW); (iv) unique waveform so as to distinguish between other radar systems. Some examples for unique waveforms may be Barker-codes; or (v) a signal pattern so as to properly query and interrogate the transponders located on the UAVs. The RF signal at the mixer's 105n output is filtered by RF LO filter 105o. The filtered signal out of RF LO filter 105o is amplified by RF amplifier 105p and directed toward RF LO power divider 105q. The output ports 105r of the RF LO power divider 105q are connected directly to each Rx/Tx module.

Figure 12:
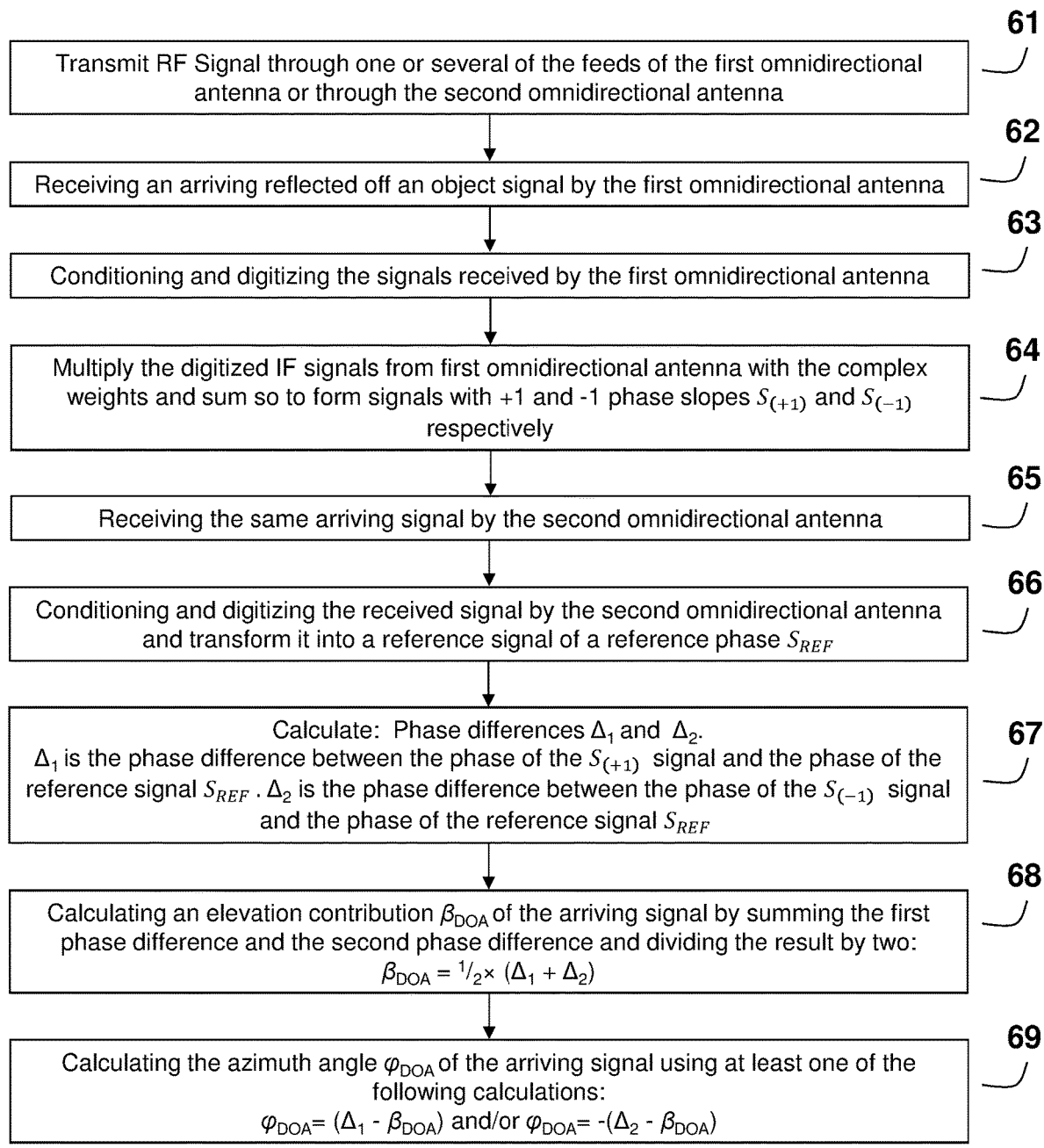
FIG. 12 shows a method for implementing multimodal and interferometer DOA techniques to infer the bearing of an impinging received signal in azimuth and elevation where the modal beams are formed and processed in the digital domain according to some embodiments of the invention.

Reference is now made to FIG. 12 which schematically illustrates a method for implementing multimodal and interferometer DOA techniques to infer the bearing of an impinging received signal in azimuth and elevation where the modal beams are formed and processed in radar systems in the digital domain, according to some embodiments of the invention. The method may be fitted for a radar system comprising a first omnidirectional antenna and a second omnidirectional antenna such as is described above with respect to FIGS. 4-11, where the DSPC processes the digitized IF signals so as to produce first-order output signals of opposite phase slopes (+1) and (−1). The method may comprise the following steps. At step 61, an RF signal is transmitted, through one or several of the feeds connected to the first omnidirectional antenna or through the second omnidirectional antenna feed. At step 62, an arriving reflected-off an object signal is received, by the first omnidirectional antenna. At step 63, the signals received by the first omnidirectional antenna 62 are conditioned and digitized by the respective ADCs. The digitizing of the signal preferably but not necessarily is performed following amplification and/or filtering. At step 64, the digitized IF signals from first omnidirectional antenna are multiplied with the complex weights. The complex weighted signals are summed so to form signals with +1 and −1 phase slopes $S_{(+1)}$ and $S_{(-1)}$ respectively. At step 65, the same arriving reflected off an object signal is received the second omnidirectional antenna. At step 66, the signals received by the second omnidirectional antenna are conditioned and digitized by the respective ADC. The digitizing of the signal preferably but not necessarily is performed following amplification and/or filtering so as to transform it into a reference signal of phase reference $S_{REF}$. At step 67 $\Delta_1$ and $\Delta_2$ are calculated, wherein $\Delta_1$ is the phase difference between the phase of the $S_{(+1)}$ signal and the reference phase and $\Delta_2$ is the phase difference between the phase of the $S_{(-1)}$ signal and the reference phase. The phase differences $\Delta_1$ and $\Delta_2$ are calculated by simple algebraic operations:

$$\Delta_1 = \arg(S_{(+1)}) - \arg(S_{REF})$$

$$\Delta_2 = \arg(S_{(-1)}) - \arg(S_{REF})$$

The first phase difference $\Delta_1$ is proportional to $(\varphi+\beta)$ wherein $\varphi$ is proportional to the azimuth of the arriving signal and $\beta$ is the elevation contribution of the arriving signal, which corresponds to the elevation angle and the distance between the first omnidirectional antenna and the second omnidirectional antenna. The second phase difference $\Delta_2$ is proportional to $(-\varphi+\beta)$. At step 68, the elevation contribution $\beta_{DOA}$ is calculated, wherein the elevation contribution is extracted by summing the first phase difference and the second phase difference and dividing the result by two:

$$\beta_{DOA} = \tfrac{1}{2} \times (\Delta_1 + \Delta_2)$$

where $\beta_{DOA}$ corresponds to the elevation $\alpha$ according to $$\frac{2\pi D}{\lambda} \sin(\alpha)$$

where $\lambda$ is the wavelength of the arriving signal. At step 69, the azimuth angle $\varphi_{DOA}$ are calculated, wherein calculating the azimuth angle is extracted by using at least one of the calculations of:

$$\varphi_{DOA} = (\Delta_1 - \beta_{DOA})$$

and/or $$\varphi_{DOA} = -(\Delta_2 - \beta_{DOA});$$

Figure 13:
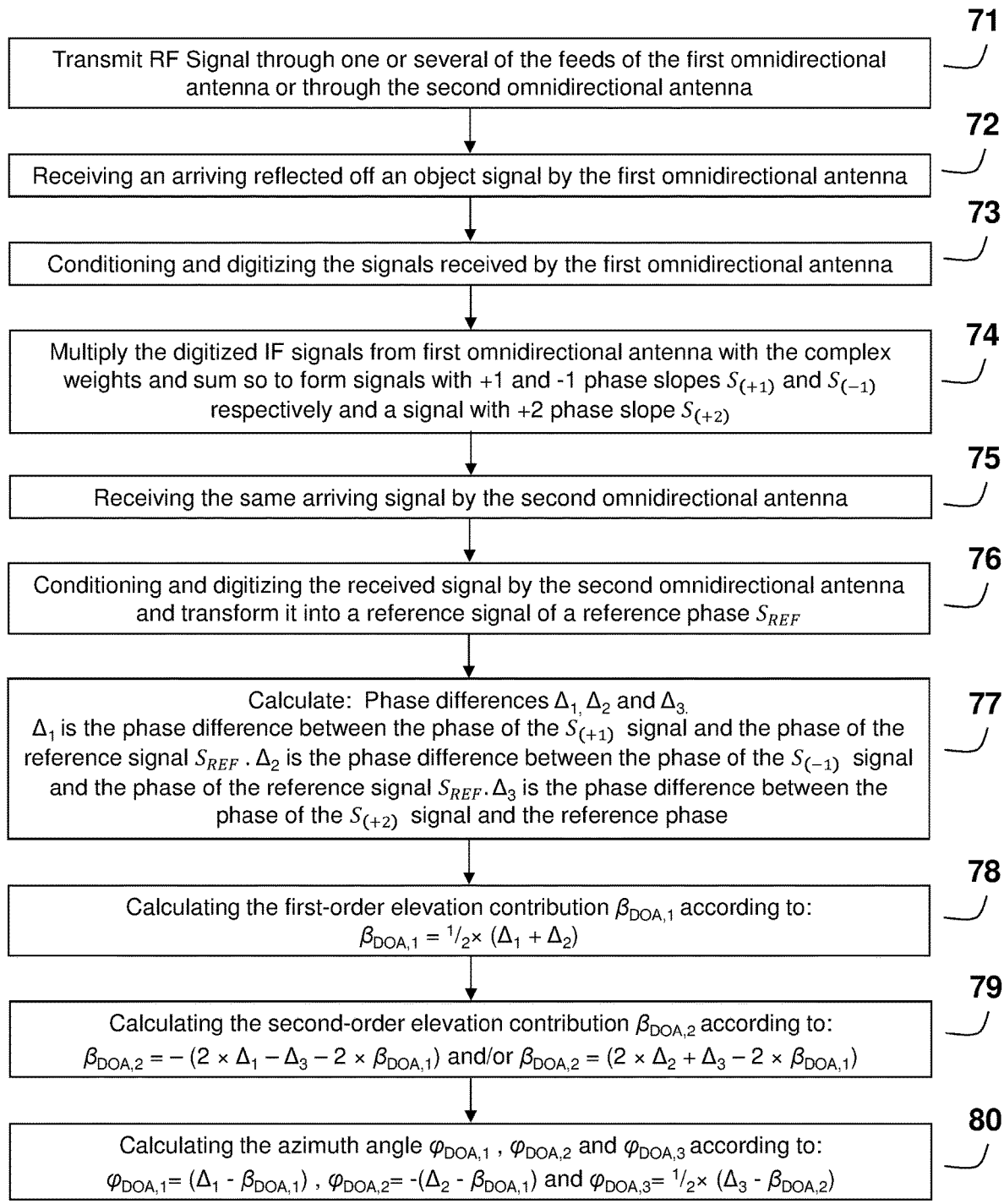
FIG. 13 shows a method for implementing multimodal and interferometer DOA techniques to infer the bearing of an impinging received signal in azimuth and elevation where the modal beams are formed and processed in the digital domain according to other embodiments of the invention.

Reference is now made to FIG. 13, which schematically illustrates a method for implementing multimodal and interferometer DOA techniques to infer the bearing of an impinging received signal in azimuth and elevation where the modal beams are formed and processed in radar systems in the digital domain, according to some embodiments of the invention. The method may be fitted for a radar system comprising a first omnidirectional antenna and a second omnidirectional antenna, where the DSPC processes the digitized IF signals so as to produce first-order output signals of opposite phase slopes (+1) and (−1) and a second-order output signal (+2). The method may comprise, at step 71, transmitting an RF signal through one or several of the feeds connected to first omnidirectional antenna or through second omnidirectional feed. At step 72, an arriving reflected off an object signal is received by the first omnidirectional antenna. At step 73, the signals received by the first omnidirectional antenna are conditioned and digitized by the ADCs. The digitizing of the signal preferably but not necessarily is performed following amplification and/or filtering. At step 74, the digitized IF signals from first omnidirectional antenna are multiplied with the complex weights. The complex weighted signals are summed so to form signals with +1 and −1 phase slopes $S_{(+1)}$ and $S_{(-1)}$ respectively and a signal with +2 phase slope $S_{(+2)}$. At step 75, the same arriving reflected off an object signal is received by the second omnidirectional antenna. At step 76, the signals received by the second omnidirectional antenna are conditioned and digitized by the ADCs. The digitizing of the signal preferably but not necessarily is performed following amplification and/or filtering so as to transform the signals into reference signals of phase reference $S_{REF}$. At step 77, $\Delta_1$, $\Delta_2$ and $\Delta_3$ are calculated, wherein $\Delta_1$ is the phase difference between the phase of the $S_{(+1)}$ signal and the reference phase, $\Delta_2$ is the phase difference between the phase of the $S_{(-1)}$ signal and the reference phase and $\Delta_3$ is the phase difference between the phase of the $S_{(+2)}$ signal and the reference phase. The phase differences $\Delta_1$, $\Delta_2$ and $\Delta_3$ are calculated by simple algebraic operations:

$$\Delta_1 = \arg(S_{(+1)}) - \arg(S_{REF})$$

$$\Delta_2 = \arg(S_{(-1)}) - \arg(S_{REF})$$

$$\Delta_3 = \arg(S_{(+2)}) - \arg(S_{REF})$$

The first phase difference $\Delta_1$ is proportional to $(\varphi+\beta_1)$ wherein $\varphi$ is proportional to the azimuth of the arriving signal and $\beta$ is the elevation contribution of the arriving signal, which corresponds to the elevation angle and the distance between first omnidirectional antenna and second omnidirectional antenna. The second phase difference $\Delta_2$ is proportional to $(-\varphi+\beta_1)$ and the third phase difference $\Delta_3$ is proportional to $(2\varphi+\beta_2)$ where $\beta_2$ is second-order elevation contribution. At step 78, the first-order elevation contribution $\beta_{DOA,1}$ is calculated, wherein the first-order elevation contribution is extracted by summing the first phase difference and the second phase difference and dividing the result by two:

$$\beta_{DOA,1} = \tfrac{1}{2} \times (\Delta_1 + \Delta_2).$$

The second-order elevation contribution $\beta_{DOA,2}$ is then calculated according to $$\beta_{DOA,2} = -(2 \times \Delta_1 - \Delta_3 - 2 \times \beta_{DOA,1})$$

and/or $$\beta_{DOA,2} = (2 \times \Delta_2 + \Delta_3 - 2 \times \beta_{DOA,1}) 79;$$

The azimuth angles $\varphi_{DOA,1}$, $\varphi_{DOA,2}$ and $\varphi_{DOA,3}$ are calculated according to:

$$\varphi_{DOA,1} = (\Delta_1 - \beta_{DOA,1}), \varphi_{DOA,2} = -(\Delta_2 - \beta_{DOA,1})$$

and $$\varphi_{DOA,3} = \tfrac{1}{2} \times (\Delta_3 - \beta_{DOA,2}).$$

The DSPC enables the calculation of any modal order required to infer the DOA according to combined multimodal and interferometry techniques namely, at least two signals of the same modal order with opposite phase slope and at least one of the first order.

Figure 14:
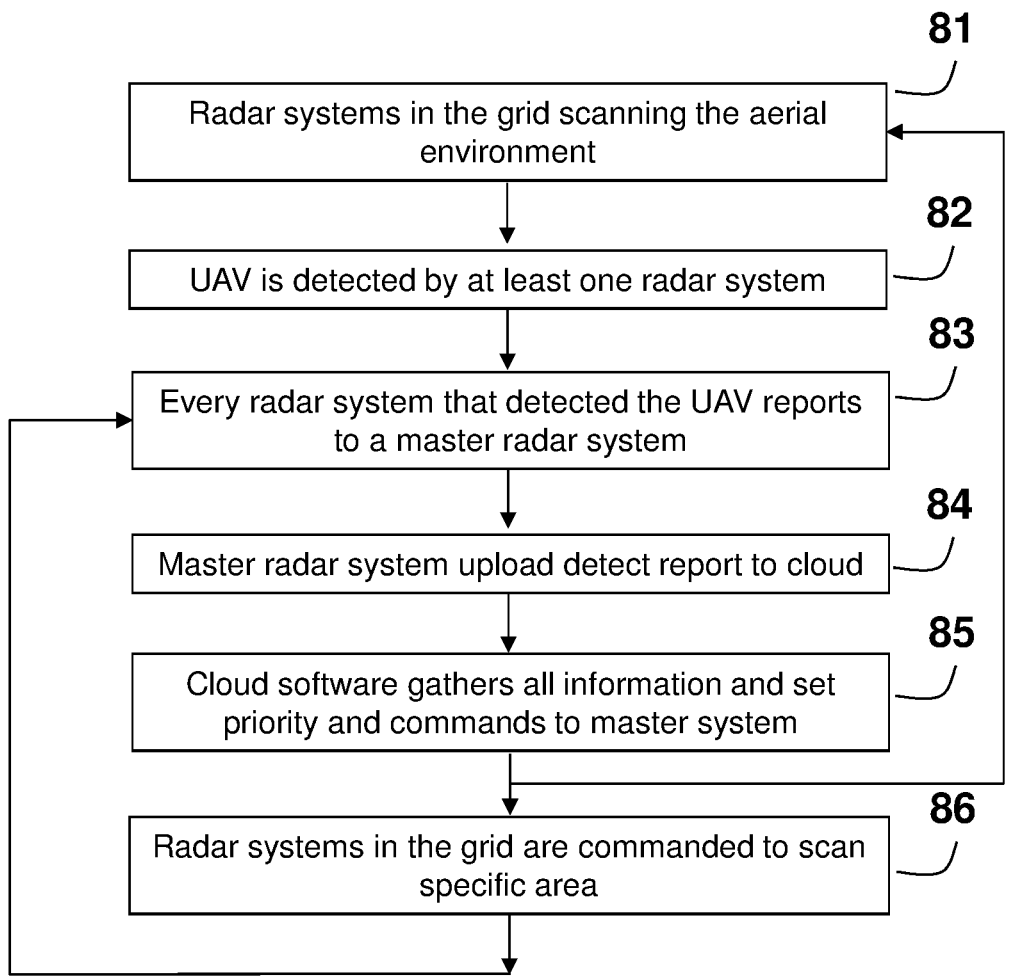
FIG. 14 shows a method for aerial traffic monitoring operation according to some embodiments of the invention.

Reference is now made to FIG. 14, which schematically illustrates a method for aerial traffic monitoring operation. Other methods of operation are possible. At step 81, some or all radar systems 100, 100' in the grid 1000 are scanning the entire aerial environment, namely azimuthal coverage from 0° to 360° within a predefined range of elevations below and above the horizon. The range of elevations may be, for example, from −45° to 45° elevation below and above the horizon, respectively, enabling coverage of blind zones thereby assuring detection and tracking in high density or compact environment. At step 82, the location of a UAV is detected by one or several radar systems 100, 100' in the grid 1000, using the results of the scan to determine the exact location of the UAV. At step 83, each of the grid member reports the detection to a "master" radar system. The radar system set to be the "master system" is chosen by the cloud software. According to some embodiments of the invention, the cloud software holds a priority list of all radar systems it is connected to. The cloud software automatically selects the radar system of highest priority as a master. The priority is determined according to predefined set of rules such as, but not limited to, link quality between each radar system and the cloud, number of other radar systems within line-of-sight, et cetera. Another method of selecting the master system may be realized according to master-election algorithms known in the art, e.g., "A Distributed Algorithm for Minimum-Weight Spanning Trees", R. G. Gallager, P. A. Humblet and P. M. Spira, ACM Transactions on Programming Languages and Systems (TOPLAS), Volume 5 Issue 1, January 1983 Pages 66-77, the entirety of which is incorporated by reference herein. At step 84, the master system uploads a report to the data cloud that identifies the detected UAV or UAVs by its unique identifier. The report is stored in a non-transitory memory (not shown) in the data cloud. The reported data may also contain additional data such as but not limited to, time of detection, range, azimuth, elevation, radar-cross-section (RCS). According to one embodiment, the report also provides the calculated DOA for that UAV based on the results of the calculations shown in FIGS. 12-13 described above. At step 85, the data cloud software, stored in a non-transitory memory and configured to be executed by a processor (not shown), can obtain a decision according to the situational awareness picture to either to continue with searching the aerial environment for UAVs or issue an order to some or all the radars in the grid to search for a specific UAV or several UAVs in the aerial environment. A decision to continue searching may be made in cases where no suspected activity is observed, for example, the aerial traffic load is minor and the transponder had replied to inquiries. A decision to scan specific UAVs can be made in cases where a suspicious activity is observed, for example, a group of UAVs was detected but no reply was received to any of several inquiries. The decision is downloaded to the master radar system 100 or 100'. At step 86, the master system issues a command of scanning specific areas to some or all radar systems in the grid, and steps 83-86 are repeatedly and continuously executed in turn, so that detection of the positions of the UAVs can be detected at all times, so that collisions can be avoided.

Figure 15:
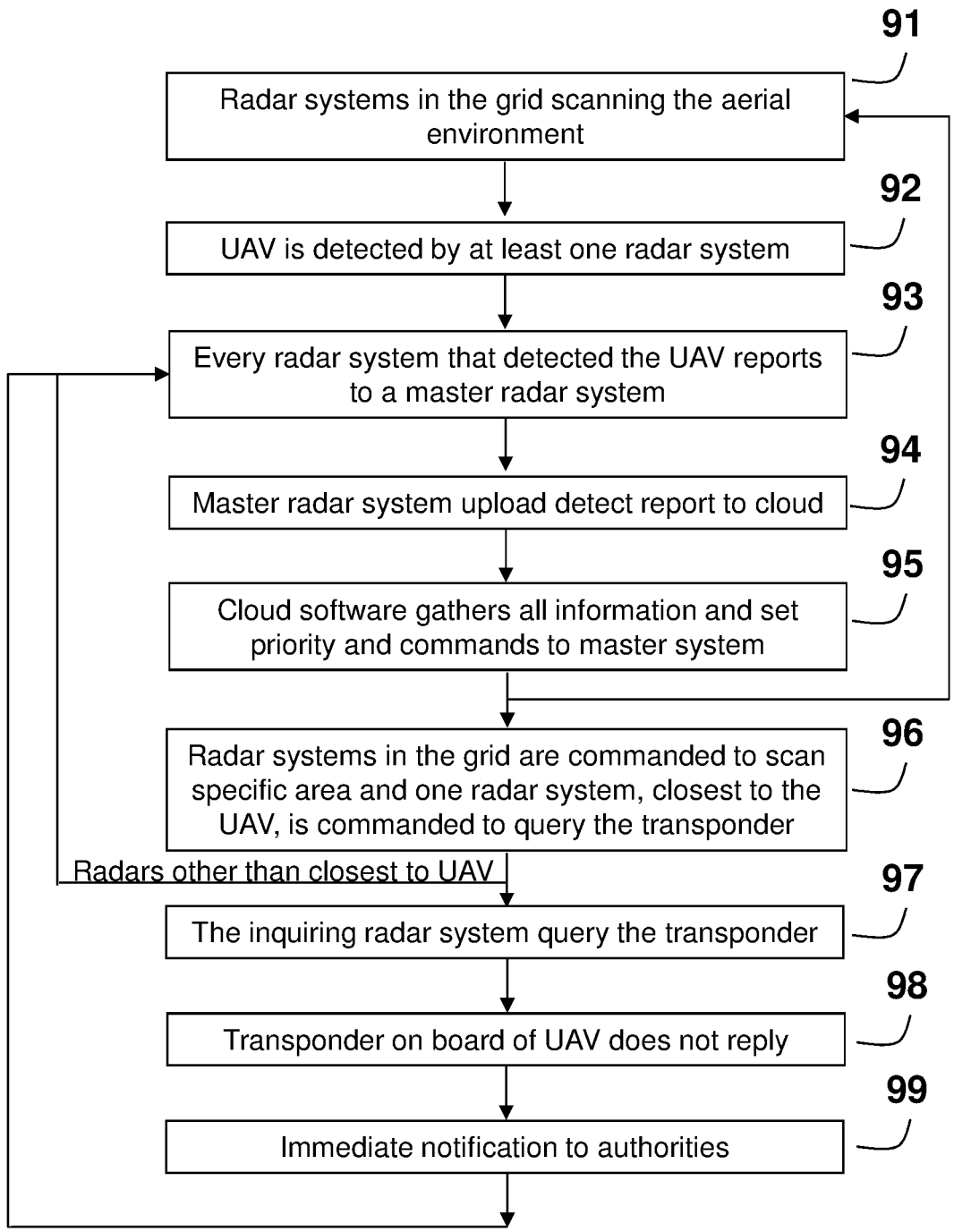
FIG. 15 shows a method for aerial traffic monitoring operation according to some embodiments of the invention.

Reference is now made to FIG. 15, which schematically illustrates a method for aerial traffic monitoring operation. Other methods of operation are possible. At step 91, some or all radar systems 100, 100' in the grid 1000 are scanning the entire aerial environment, namely azimuthal coverage from 0° to 360° within a predefined range of elevations below and above the horizon. The range of elevations may be, for example, from −45° to 45° elevation below and above the horizon, respectively, enabling coverage of blind zones thereby assuring detection and tracking in high density or compact environment. At step 92, the location of a UAV is detected by one or several radar systems 100, 100' in the grid 1000, using the results of the scan to determine the exact location of the UAV. At step 93, each of the grid member reports the detection to a "master" radar system. The radar system set to be the "master system" is chosen by the cloud software. According to some embodiments of the invention, the cloud software holds a priority list of all radar systems it is connected to. The cloud software automatically selects the radar system of highest priority as a master. The priority is determined according to predefined set of rules such as, but not limited to, link quality between each radar system and the cloud, number of other radar systems within line-of-sight, et cetera. Another method of selecting the master system may be realized according to master-election algorithms known in the art, e.g., "A Distributed Algorithm for Minimum-Weight Spanning Trees", R. G. Gallager, P. A. Humblet and P. M. Spira, ACM Transactions on Programming Languages and Systems (TOPLAS), Volume 5 Issue 1, January 1983 Pages 66-77, incorporated by reference in its entirety herein. At step 94, the master system is uploading a report to the data cloud that identifies the detected UAV or UAVs by its unique identifier. The report is stored in a non-transitory memory (not shown) in the data cloud. The reported data may also contain additional data such as but not limited to, time of detection, range, azimuth, elevation, radar-cross-section (RCS). According to one embodiment, the report also provides the calculated DOA for that UAV based on the results of the calculations shown in FIGS. 12-13 described above. At step 95, the data cloud software, stored in a non-transitory memory and configured to be executed by a processor (not shown), can obtain a decision according to the situational awareness picture to either to continue with searching the aerial environment for UAVs or issue an order to some or all the radars in the grid to search for a specific UAV or several UAVs in the aerial environment. A decision to continue searching may be made in cases where no suspected activity is observed, for example, the aerial traffic load is minor and the transponder had replied to inquiries. A decision to scan specific can be made in cases where a suspicious activity is observed, for example, a group of UAVs was detected but no reply was received to any of several inquiries. The decision is downloaded to the master radar system 100 or 100'. At step 96, the master system issues commands of scanning specific areas to some or all radar systems in the grid and also issues a different command to the closest radar system to query the UAV. At step 97, the closest radar system transmits an inquiry code to the on-board transponder 202. At step 98, the transponder does not respond. At step 99, the specific radar system that issued the inquiry releases an immediate alert to the authorities such as the FAA or any other national authority. Steps 93-99 are repeatedly and continuously executed in turn, as needed so that detection of the positions of the UAVs can be detected at all times, so that collisions can be avoided.

Many alterations and modifications may be made by those having ordinary skill in the art without departing from the spirit and scope of the invention. Therefore, it must be understood that the illustrated embodiments have been set forth only for the purposes of example and that should not be taken as limiting the invention as defined by the following claimed invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

What is claimed is:

1. An unmanned aerial vehicles (UAVs) aerial traffic monitoring system comprising:
   one or more UAVs comprising a transponder and at least one of a transmitter, a localization module and/or a communication module;
   a plurality of radar systems, positioned on buildings or on a ground surface, each of the plurality of radar systems comprising a stationary antenna system, comprising at least one non-rotating antenna, configured so as to transmit and receive radio frequency (RF) signals from which a direction-of-arrival (DOA) of reflected signals is inferred so as to cover and locate the UAVs from 0° to 360° in azimuth and within a range of from −45° to 45° in elevations below and above the horizon;
   a cloud software stored in a non-transitory memory and configured to be executed by a processor, that stores records of operating UAVs covered and located by the plurality of radar systems so as to allow online and real time situational awareness of UAV aerial traffic, aerial traffic load, and aerial collision predictions.

2. The system according to claim 1, wherein the transponder is a device that emits an identifying signal in response to receiving an interrogating signal.

3. The system according to claim 1, wherein the communication module is selected from cellular and/or satellite communication module, and the localization module is selected from global positioning system (GPS), and/or inertial navigation system (INS).

4. The system according to claim 1, wherein the data cloud is selected from a civilian data cloud or law enforcement data cloud.

5. The system according to claim 4, wherein the data cloud comprises a receiving and transmitting circuitry for communicating with the plurality of radar systems, and a processor configured to process information obtained from the plurality of radar systems.

6. The system according to claim 1, wherein the data cloud is accessible for receiving and providing information concerning a spatial location of the one or more UAVs and/or other objects.

7. The system according to claim 6, wherein the other objects are humans, ground transportation, airplanes or animals.

8. The system according to claim 1, wherein the data management system is accessible to national/official authorities and/or to private facilities.

9. The system according to claim 1, further comprising plurality of radar systems configured to communicate with the one or more UAVs.

10. The system according to claim 1, wherein the antenna system comprises:
    a plurality of antenna elements configured so as to transmit and receive radio frequency (RF) signals;
    a plurality of receiving and/or transmitting (Rx/Tx) modules connected to respective ones of the plurality of antenna elements to transmit and receive the RF signals to and from the plurality of antenna elements;
    a digital signal processing unit (DSPC) operably connected to the plurality of Rx/Tx modules and configured and operable to process received RF signals to infer the direction-of-arrival (DOA) of reflected signals covering 360° azimuth within the predefined range of elevations below and above the horizon to detect, identify and track the target; and
    an exciter module operably connected to the DSPC and configured and operable to generate and distribute timing signals to the DSPC, the Rx/Tx modules and the plurality of antenna elements.

11. The system according to claim 10, wherein each of the Rx/Tx modules is operatively and directly connected to the respective one of the plurality of antenna elements.

12. The system according to claim 10, wherein the Rx/Tx module allows excitation of microwave signals resulting in radiated energy at 0°-360° azimuthal direction.

13. The system according to claim 10, wherein the Rx/Tx module further converts a received RF signal into an intermediate frequency (IF) signal, by mixing the received RF signal with a local oscillator (LO) signal.

14. The system according to claim 10, wherein the DSPC is configured and operable to process the intermediate frequency (IF) signal so as to infer the azimuth and elevation of an incoming RF signal.

15. The system according to claim 10, wherein the antenna system comprises:

a first omnidirectional antenna; and
a second omnidirectional antenna, which is located coaxially about a predefined vertical axis in relation to the first omnidirectional antenna and separated therefrom at a predefined vertical distance.

16. The system according to claim 10, further comprising the analog-to-digital converter located on the DSPC or on the Rx/Tx modules.

17. The system according to claim 10, wherein the Rx/Tx modules comprises:
an RF circulator connected to receive an RF signal from a corresponding one of the antenna elements and a Tx signal excited at a Tx input port of the Rx/Tx module and filtered by an RF Tx filter and output the received RF signal and the filtered Tx signal;
an RF amplifier connected to the first RF filter to amplify the received RF signal;
an RF-to-IF mixer connected to the RF amplifier to downconvert the received RF signal into an intermediate frequency (IF) signal by mixing the received RF signal with a local oscillator (LO) signal;
an IF filter connected to an output of the RF-to-IF mixer to filter the IF signal; and
an IF amplifier connected to the IF filter to receive the filtered IF signal and output an amplified IF signal.

18. The system according to claim 10, wherein the DSPC comprises:
a plurality of analog-to-digital converters (ADCs), each one connected to receive an IF signal from a corresponding one of the Rx/Tx modules to convert an analog RF signal received from a corresponding one of the antenna elements to a digital signal;
a programmable logic component field-programmable gate array (FPGA) connected to an output of the ADCs for receiving digital signals from the ADCs and multiply each digital signal received from the first omnidirectional antenna by an appropriate complex weight to digitally obtain model beams with a desired order and phase slope, wherein the digital signal received from the second omnidirectional antenna is time-delayed to compensate for time consumed by multiplication of the digitized IF signal received by the first omnidirectional antenna and transform the digitized IF signal received by the second omnidirectional antenna into a reference signal;
a digital-signal-processor (DSP) connected to the FPGA to receive the output signals of the desired modal order and phase slopes and the output reference signal for further processing; and
a microcontroller connected to the FPGA and the DSP to monitor voltages and temperature of the DSPC.

19. The system according to claim 10, wherein the exciter module is further configured to generate and distribute local oscillator (LO) signals and/or transmission signals (Tx).

20. The system according to claim 19, wherein the exciter module comprises a distribution mechanism configured to distribute the LO signal to the Rx/Tx modules.

21. The system according to claim 10, wherein the exciter module comprises:
a master oscillator that generates clock signals;
an RF Tx filter;
a Tx chain synthesizer module having an output connected to the RF Tx filter to filter any unwanted signals that are present at the output of the Tx chain synthesizer module and output a filtered signal;
an LO chain synthesizer module;
a clock distributor module connected to the master oscillator and configured to distribute the clock signals to the antenna elements, the Rx/Tx modules, the DSPC, the Tx chain synthesizer module and the LO chain synthesizer module;
an RF Tx power divider having output ports each connected directly to a respective one of the Rx/Tx modules; and
an RF amplifier connected to an output of the RF Tx filter to amplify the filtered signal from the RF Tx filter to output an amplified signal, and direct the amplified signal toward an RF Tx power divider.

22. The system according to claim 10, wherein the antenna system comprises a first omnidirectional antenna configured to form a circular array.

23. The system according to claim 10, wherein the antenna system is configured for estimation of the direction-of-arrival (DOA) of a signal that arrives from the horizon within an azimuth of from 0° to 360°, and an elevation angle which is in a range of from −45° to 0° below the horizon or 0° to 45° above the horizon.

24. The system according to claim 10, wherein each antenna system comprises a plurality of antenna elements comprising:
a first omnidirectional antenna; and
a second omnidirectional antenna, which is located coaxially about a predefined vertical axis in relation to the first omnidirectional antenna and separated therefrom at a vertical distance;
wherein:
the first omnidirectional antenna is configured and operable to receive an arriving signal and transform the received signal into a plurality of output signals that are processed in the DSPC to generate at least two output signals: a first output signal and a second output signal, wherein the phases of the output signals are proportional to the azimuth angle of the arriving signal;
the second omnidirectional antenna is configured and operable to receive an arriving signal and transform the received signal into a reference signal of a reference phase, the reference phase has a zero phase-slope and is independent of the azimuth angle of the arriving signal;
the phases of first and second output signals are shifted from the reference phase by a phase shift that depends upon the elevation direction of the arriving signal, corresponding to the distance between the first and second omnidirectional antennas;
wherein the antenna system is configured to allow extracting at least two phase differences: a first phase difference $\Delta_1$ between the phase of the first output signal and the reference phase, and a second phase difference $\Delta_2$ between the phase of the second output signal and the reference phase,
wherein each one of the phase differences includes a first phase component proportional to the azimuth angle of the arriving signal and a second phase component corresponding to the elevation angle of the arriving signal, and
wherein the antenna system is further configured to enable extracting the azimuth and the elevation angles of the arriving signal from the phase differences.

25. The system according to claim 24, wherein the first omnidirectional antenna is connected to a waveguide which is a circular waveguide (CWG).

26. The system according to claim 25, wherein the circular waveguide (CWG) is configured to guide a $TE_{11}$ and $TE_{21}$ or higher-order circular-waveguide-modes received from the first omnidirectional antenna, and is of a diameter configured to allow the propagation of the higher order circular-waveguide-modes.

27. The system according to claim 25, wherein the CWG comprises a plurality of output feeds.

28. The system according to claim 24, wherein the first omnidirectional antenna is a multimodal omnidirectional antenna comprising a biconical horn antenna.

29. The system according to claim 15, wherein the second omnidirectional antenna is a biconical dipole antenna.

30. The system according to claim 15, wherein the second omnidirectional antenna is coaxially located above the first omnidirectional antenna, and a feed line is coaxially inserted through the waveguide portion of the first omnidirectional antenna.

31. The system according to claim 10, wherein the antenna system is configured and operable to output a plurality of output signals, digitally processed so as to generate a plurality of phase modes.

32. The system according to claim 10, wherein the antenna system is configured and operable to estimate the DOA of a wireless RF signal.

33. The system according to claim 1, wherein the plurality of radars are connected so as to operate in a grid.

34. The system according to claim 33, wherein at least a portion of the plurality of radars in the grid operates individually and passes the processed information to the data management system and/or obtains information from the data management system data cloud.

35. The system according to claim 33, wherein the data management system is a data cloud.

36. The system according to claim 33, wherein at least a portion of the plurality of radars in the grid are configured to operate independently of each other and/or cooperatively with each other.

37. The system according to claim 33, wherein at least a portion of the plurality of radars in the grid are configured to distinguish between autonomous grid-members generated RF signals and externally generated RF signals.

38. The system according to claim 1, wherein the one or more unmanned aerial vehicles comprise autonomous or remotely piloted aerial vehicles.

39. The system according to claim 38, wherein the UAV are selected from UAVs designed for military and civil applications, including, target and decoy, reconnaissance, combat, surveillance, delivery and commercial applications.

40. The system according to claim 38, wherein the UAVs are selected from UAVs that are a rotorcraft, fixed wing, or hybrid vehicle.

41. The system according to claim 40, wherein at least one of the UAVs is a rotorcraft selected from a single-rotor, dual rotor, trirotor, quadrorotor (quadcopter), hexarotor, or octorotor design.

\* \* \* \* \*